US011996013B2

(12) United States Patent
Vimercati

(10) Patent No.: US 11,996,013 B2
(45) Date of Patent: May 28, 2024

(54) LABEL AND MANUFACTURING METHOD

(71) Applicant: PILOT ITALIA S.P.A., Milan (IT)

(72) Inventor: Giancarlo Vimercati, Milan (IT)

(73) Assignee: PILOT ITALIA S.P.A., Milan (IT)

( * ) Notice: Subject to any disclaimer, the term of this patent is extended or adjusted under 35 U.S.C. 154(b) by 241 days.

(21) Appl. No.: 17/608,084

(22) PCT Filed: May 4, 2020

(86) PCT No.: PCT/IB2020/054192
§ 371 (c)(1),
(2) Date: Nov. 1, 2021

(87) PCT Pub. No.: WO2020/222209
PCT Pub. Date: Nov. 5, 2020

(65) Prior Publication Data

US 2022/0284834 A1 Sep. 8, 2022

(30) Foreign Application Priority Data

May 2, 2019 (IT) ........................ 102019000006478

(51) Int. Cl.
*G09F 3/00* (2006.01)
*G09F 3/02* (2006.01)
*G09F 3/10* (2006.01)

(52) U.S. Cl.
CPC .................. *G09F 3/02* (2013.01); *G09F 3/10* (2013.01); *G09F 2003/0208* (2013.01); (Continued)

(58) Field of Classification Search
CPC ......... G09F 3/00-10; G09F 2003/0208; G09F 2003/0247; G09F 2003/0257; G09F 2003/027; G09F 2003/0273
See application file for complete search history.

(56) References Cited

U.S. PATENT DOCUMENTS 5,135,125 A 8/1992 Andel et al.
5,490,658 A * 2/1996 Coward ............... B65D 23/005 248/205.3
(Continued)

FOREIGN PATENT DOCUMENTS

CN 201685500 U 12/2010
CN 103569456 A * 2/2014 ........... B65D 23/005
(Continued)

OTHER PUBLICATIONS

International Search Report and Written Opinion for International Patent Application No. PCT/IB2020/054192, dated Sep. 2, 2020, 11 pages.

(Continued)

*Primary Examiner* — Nguyen Q. Ha
(74) *Attorney, Agent, or Firm* — Armstrong Teasdale LLP

(57) ABSTRACT

A method for manufacturing a label with a hanging handle includes providing a first laminated material having a backing layer and a first frontal layer having a frontal surface, coating the frontal surface with a layer of release promoter, leaving a free zone, providing a second laminated material having a second frontal layer and having a predefined thickness and an adhesive layer, joining the first and second laminated materials to form an assembled component, cutting a hanging handle in a handle zone of the second laminated material only to the inside of the thickness of the second laminated material, leaving the first frontal layer intact, cutting a secondary label in a secondary label zone within the thickness of the second laminated material, forming a label outline in the first frontal layer, and removing a portion of the first frontal layer, creating a cavity that arranges a handle portion of the hanging handle.

16 Claims, 19 Drawing Sheets

(52) U.S. Cl.
CPC ................ *G09F 2003/0247* (2013.01); *G09F 2003/0257* (2013.01); *G09F 2003/027* (2013.01); *G09F 2003/0273* (2013.01)

(56) References Cited

U.S. PATENT DOCUMENTS

| | | | | |
|---|---|---|---|---|
| 5,878,901 | A | 3/1999 | Grosskopf et al. | |
| 6,082,777 | A * | 7/2000 | Grosskopf | B32B 7/12 40/310 |
| 6,272,780 | B1 * | 8/2001 | Satamian | B31D 1/0018 40/310 |
| 6,387,202 | B1 | 5/2002 | Grosskopf et al. | |
| 6,432,500 | B1 | 8/2002 | Jones et al. | |
| 7,762,398 | B2 | 7/2010 | Tokie et al. | |
| 9,005,386 | B2 * | 4/2015 | Moore | G09F 3/02 156/247 |
| 11,250,733 | B2 * | 2/2022 | Vimercati | B32B 7/12 |
| 11,508,264 | B2 | 11/2022 | Vimercati | |
| 2005/0211594 | A1 | 9/2005 | Katsuyama | |
| 2005/0230964 | A1 | 10/2005 | Seidl | |
| 2006/0057313 | A1 | 3/2006 | Moosheimer et al. | |
| 2007/0014958 | A1 * | 1/2007 | Chaplin | A61M 5/1414 428/40.1 |
| 2020/0294426 | A1 * | 9/2020 | Zoni | G09F 3/02 |

FOREIGN PATENT DOCUMENTS

| | | | | |
|---|---|---|---|---|
| CN | 109155114 | A | 1/2019 | |
| EP | 0356574 | B1 | 3/1990 | |
| EP | 1686065 | A1 * | 8/2006 | B65B 61/14 |
| EP | 2246266 | A1 | 11/2010 | |
| JP | H0872887 | A | 3/1996 | |
| JP | H11184381 | A | 7/1999 | |
| JP | 3127448 | B2 | 1/2001 | |
| JP | 2004106908 | A | 4/2004 | |
| JP | 2004233481 | A | 8/2004 | |
| JP | 2005309435 | A | 11/2005 | |
| RU | 91460 | U1 | 2/2010 | |
| SU | 1313418 | A1 | 5/1987 | |
| WO | 2009038234 | A1 | 3/2009 | |
| WO | 2018220660 | A1 | 12/2018 | |

OTHER PUBLICATIONS

International Preliminary Report on Patentability for International Patent Application No. PCT/IB2020/054192, dated Oct. 28, 2021, 23 pages.

Japan Notice of Reasons for Refusal, Application No. 2021-565116, dated Dec. 15, 2023, 8 pps.: with English translation.

* cited by examiner

LABEL AND MANUFACTURING METHOD

CROSS-REFERENCE TO RELATED APPLICATIONS

This application is a National Phase Application of PCT International Application No. PCT/IB2020/054192, having an International Filing Date of May 4, 2020 which claims priority to Italian Application No. 102019000006478 filed May 2, 2019, each of which is hereby incorporated by reference in its entirety.

FIELD OF THE INVENTION

The present invention relates to a method for manufacturing a label with a handle for hanging a bottle in an upside-down position, and a label with a handle which can be obtained by such method.

BACKGROUND OF THE INVENTION

A label with a handle applicable to a bottle is illustrated in prior art document EP0356574A2 in which such handle protrudes free from the upper edge of the label when it is not in use.

Such solution has the main disadvantage of being technically complex and costly. Further solutions of this type are known, for example, from US 2006/057313 A1, U.S. Pat. Nos. 5,878,901 A, 5,135,125 A, CN 201 685 500 U.

A similar solution is disclosed in US2006057313. FIG. 2*b* of this document shows that layers cut through their entire thickness are arranged on a silicone-coated backing layer, indicated here by reference numeral 10, to obtain a handle which rests entirely on the silicone-coated backing layer.

Document WO2018220660 shows a label consisting of a single layer resting on a silicone-coated backing layer (indicated by reference numeral 5 in FIG. 5 of this document). A supporting handle is cut into this single layer and rests entirely on this silicone-coated backing layer.

A label with a handle made by joining two separate adhesive films is known instead from prior document EP2246266A1, by the same owner.

As shown in such document, a lower film comprises the wording required to identify the infusion container, while a transparent upper film is joined in an adhesive manner to the lower film and makes the handle for turning the container up-side-down when administering its contents to a patient.

A drawback related to this prior technique is that, when the label is applied to a bottle, any printed characters placed on the surface tend to be damaged due to the mechanical stresses to which the bottle and the label are subjected at the labeling machine.

A further drawback related to this prior technique relates to the limited extension of the handle with respect to the width or height of the adhesive label, a limit which, in the case of small bottles, makes the handle unusable or difficult to use to suspend the bottles to which it is applied.

Furthermore, the need is strongly felt to have a handle label with separable secondary labels to identify the product contained in the bottle also in a separate document, separating at least one of these secondary labels, e.g. with pre-printed product indications, and applying it to the separate document, e.g. a medical record.

SUMMARY OF THE INVENTION

The present invention provides a method and a self-adhesive label capable of overcoming the drawbacks described with reference to the prior art.

In particular, the method and label according to the present invention have been designed to make the hanging handle simple to make and easy to use even if the container to which it is applied is small. Additionally, the method and label according to the present invention are designed to make the secondary label print characters resistant to abrasion forces. Furthermore, according to an advantageous aspect of the present invention, the secondary label is designed to be writable on the surface using ordinary writing instruments.

BRIEF DESCRIPTION OF THE FIGURES

The object of the present invention will now be described in detail, with reference the appended drawings, in which:

FIGS. 16 and 17 diagrammatically show a front view and an axonometric view of a label according to the present invention, according to a possible variant, in which the gripping portion of the handle and a portion of the secondary label are partially raised.

DETAILED DESCRIPTION

Figure 1:
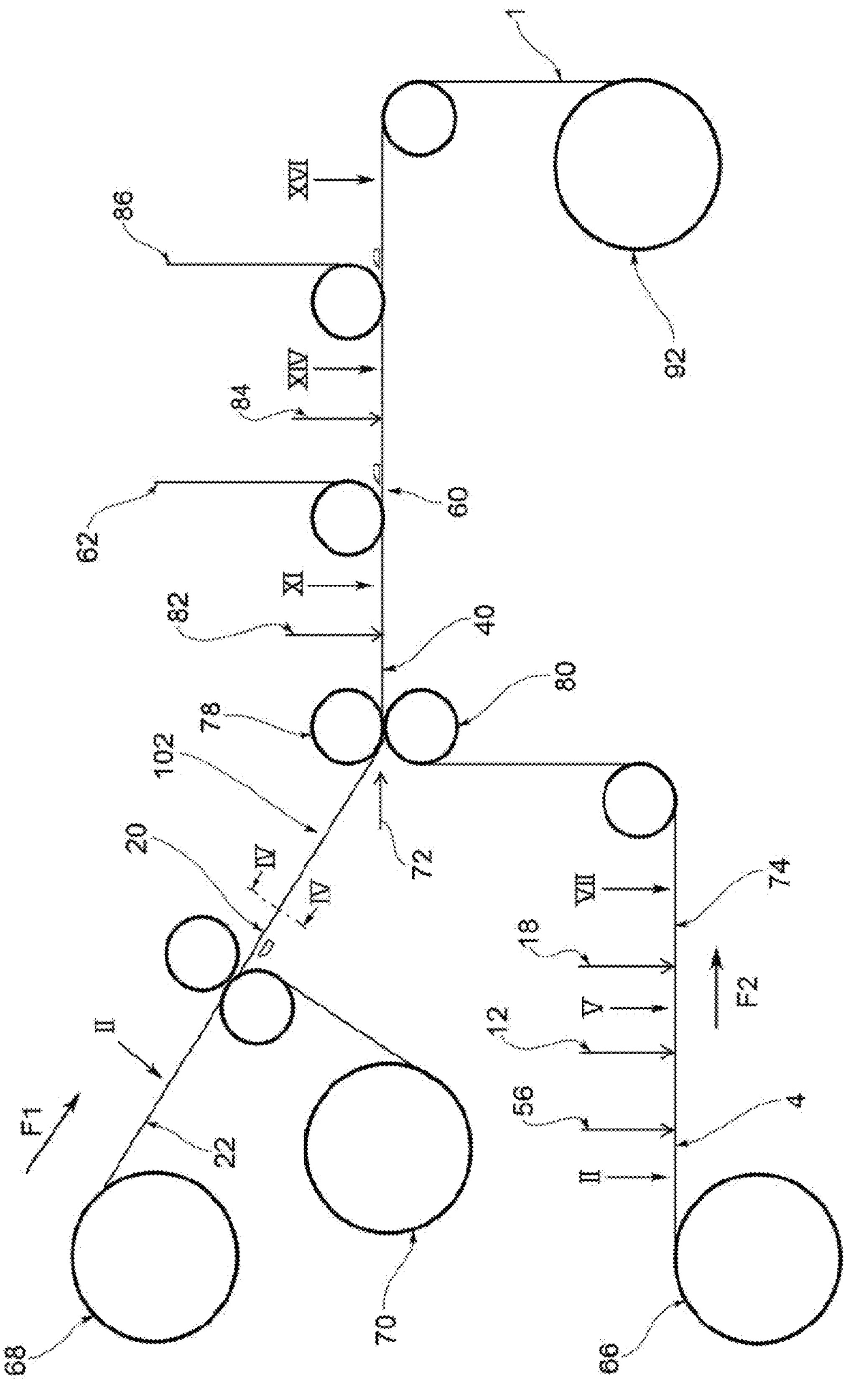
FIG. 1 diagrammatically shows a manufacturing method, which is the object of the present invention, according to a possible embodiment.
Figure 2:
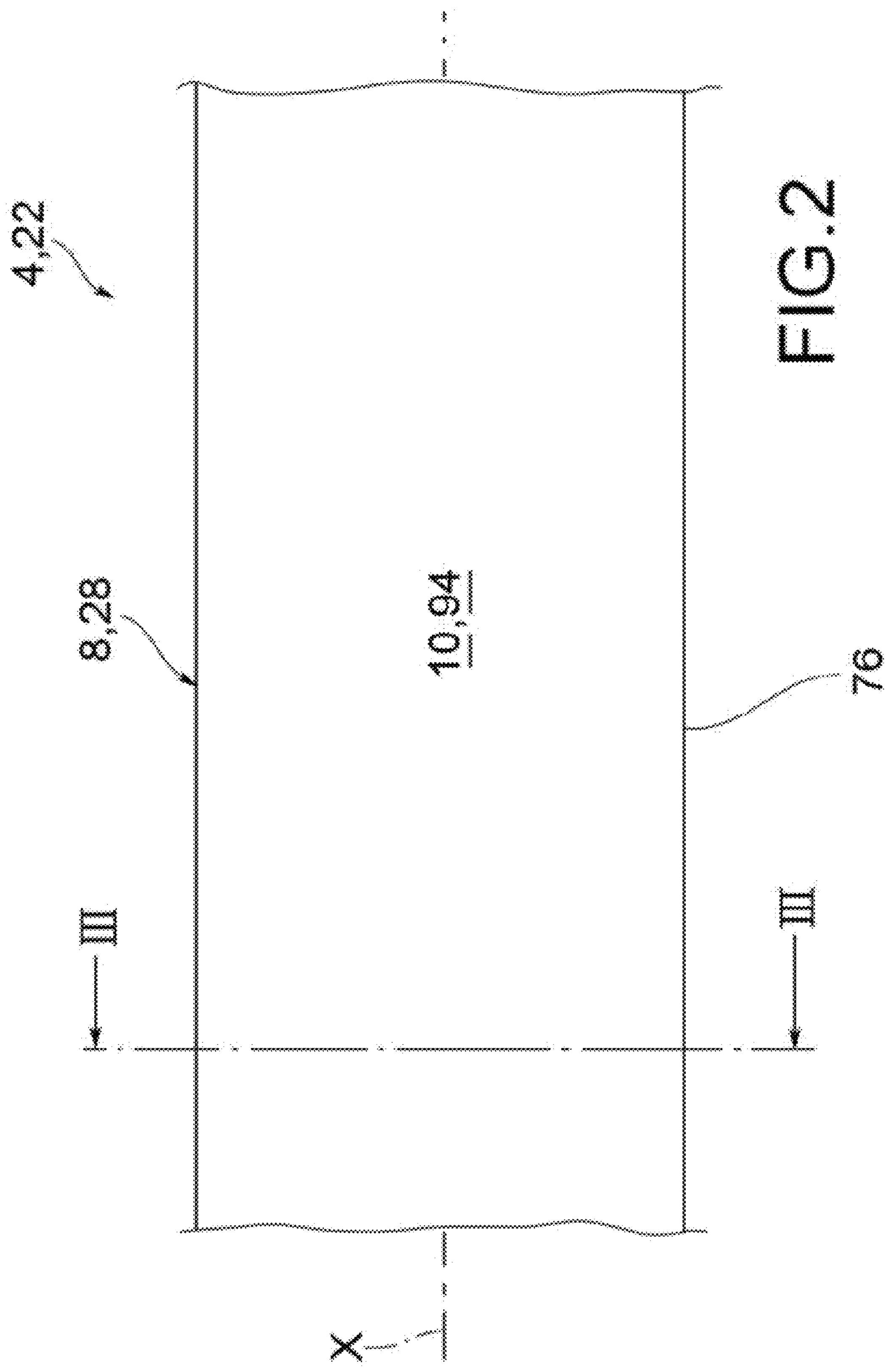
FIGS. 2, 5, 7, 11, 14, 16 show views of multi-layer material at the positions marked by numbers II, V, VII, XI, XIV, XVI in FIG. 1, in the direction of the arrow shown, respectively.
Figure 3:
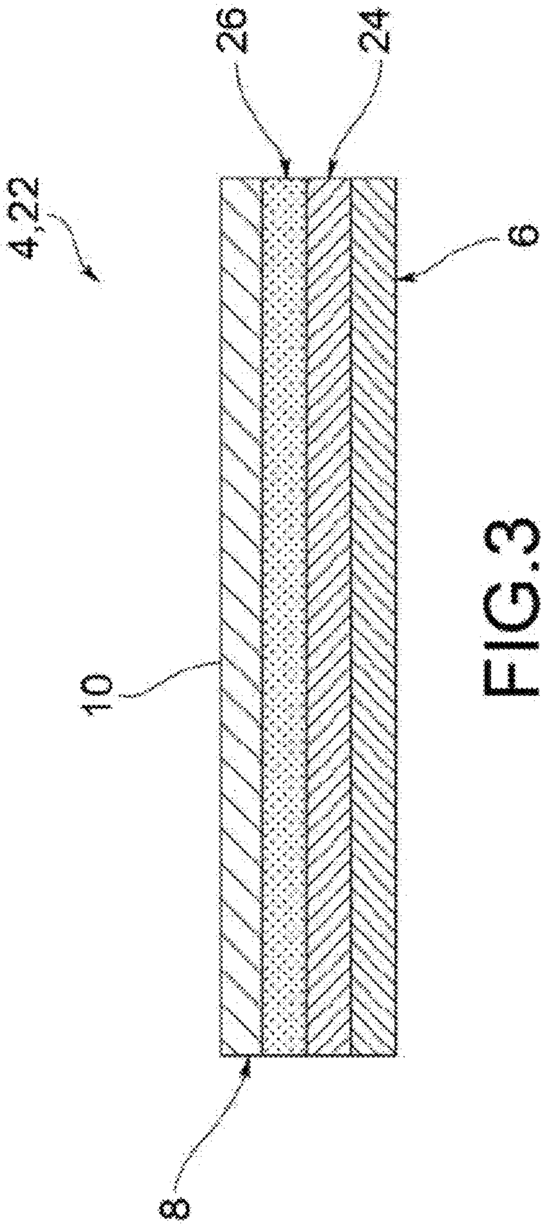
FIGS. 3, 4 show a section view taken along the plane shown in FIG. 2 and along the plane IV-IV shown in FIG. 1, respectively.
Figure 4:
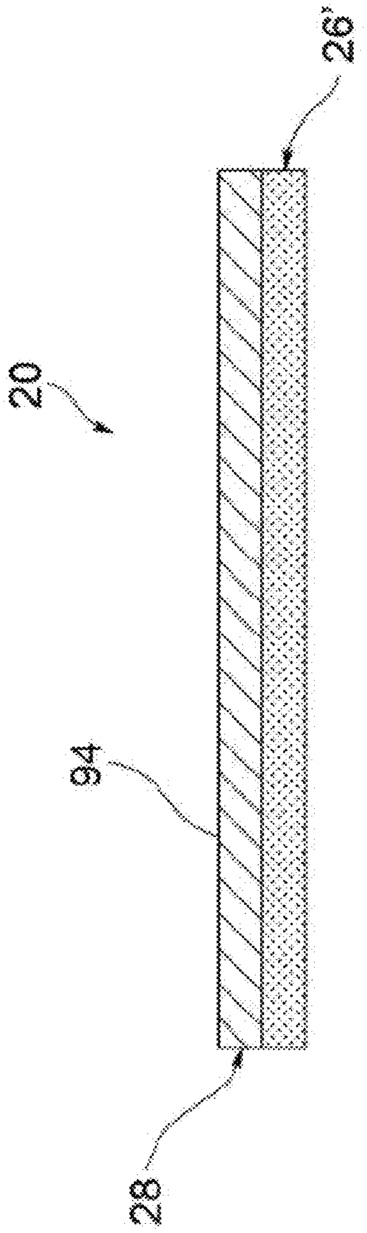

In accordance with a general embodiment, the aforesaid objectives are achieved through a method for manufacturing a label 1 with a hanging handle 2 which comprises the steps of:

i) providing a first laminated material 4 comprising a backing layer 6 and a first frontal layer 8 joined in a releasable manner, wherein the first frontal layer 8 comprises a frontal surface 10;

ii) coating the frontal surface 10 of the first frontal layer 8 with at least one layer of release promoter 12, 18, leaving a free zone 14 from which the at least one layer of release promoter 12, 18 is missing;

iv) providing a second laminated material 20 comprising a second frontal layer 28 and an adhesive layer 26', wherein the second laminated material 20 has a predefined thickness S1;

v) joining the first laminated material 4 and the second laminated material 20 to form an assembled component or laminated material 40, so that the adhesive layer 26' of the second laminated material 20 adheres at least to the free zone 14 of the first laminated material 4; and vii) cutting a hanging handle 2 in a handle zone 16 of the second laminated material 20 only to the inside of the thickness S1 of the second laminated material 20, leaving the first frontal layer 8 intact; cutting at least one secondary label 34 in a secondary label zone 36 different from the handle zone 16 only within the thickness S1 of the second laminated material 20; forming a label outline 38 in the first frontal layer 8, avoiding cutting the hanging handle 2 and removing a portion of the first frontal layer 8 thus creating a cavity 95 which arranges a handle portion 96 of the hanging handle 2, with the label formed, overhangingly protruding beyond the label outline 38.

In accordance with a general embodiment, the aforesaid objectives are achieved through a method for manufacturing a label 1 with a hanging handle 2 which comprises the steps of:

i) providing a first laminated material 4 comprising a backing layer 6 and a first frontal layer 8 joined in a releasable manner;

ii) coating a frontal surface 10 of the first frontal layer 8 with at least one layer of release promoter 12, 18, leaving a free zone 14 from which the at least one layer of promoter 12, 18 is missing;

iv) providing a second laminated material 20 comprising a second frontal layer 28 and an adhesive layer 26';

v) joining the products of steps ii) and iv) to form a coupled material 40, so that the adhesive layer 26' adheres at least to the free zone 14 of the first laminated material 4; and vii) at least in the thickness S1 of the second laminated material 20, separating a hanging handle 2 from the handle zone 16, and at least one secondary label 34 from the label 1 in a different zone 36, and forming a label outline 38 in the first frontal layer 8 so that the hanging handle 2, with the label formed, protrudes at least partially overhangingly beyond the label outline 38.

According to a general embodiment, a label 1 with a hanging handle 2 which can be obtained through the method according to the preceding embodiment, comprises:

a first laminated material 4 comprising a backing layer 6 and a first frontal layer 8 joined in a releasable manner, wherein the first frontal layer 8 comprises a frontal surface 10;

at least one layer of release promoter 12, 18, which coats a frontal surface 10 of the first frontal layer 8 leaving free a zone 14 in which the at least one layer 12, 18 of release promoter is missing;

a second laminated material 20 comprising a second frontal layer 28 and an adhesive layer 26', the second laminated material 20 being joined to the first laminated material 4 so that the adhesive layer 26' adheres at least to the free zone 14, wherein the second laminated material 20 has a predefined thickness S1;

wherein the second frontal layer 28 delimits a hanging handle 2 and a secondary label 34 in a different zone 36 of the second frontal layer 28, and wherein the first frontal layer 8 forms a label outline 38 leaving the hanging handle 2 with a handle portion 96 protruding at least partially overhanging beyond the label outline 38 outside the first frontal layer 8 directly facing the backing layer 6, thus forming a cavity 95 in which a portion of the first frontal layer 8 has been removed.

According to a general embodiment, a label 1 with a hanging handle 2, which can be obtained through the method according to the preceding embodiment, comprises:

a first laminated material 4 comprising a backing layer 6 and a first frontal layer 8 joined in a releasable manner;

at least one layer of release promoter 12, 18, which coats a frontal surface 10 of the first frontal layer 8 leaving free a zone 14 in which the at least one layer 12, 18 of release promoter is missing;

a second laminated material 20 comprising a second frontal layer 28 and an adhesive layer 26', the second laminated material 20 being joined to the first laminated material 4 so that the adhesive layer 26' adheres at least to the free zone 14;

wherein the second frontal layer 28 delimits a hanging handle 2 and a secondary label 34 in a different zone 36 of the second frontal layer 28, and wherein the first frontal layer 8 forms a label outline 38 leaving the hanging handle 2 protruding at least partially overhanging beyond the label outline 38 outside the first frontal layer 8.

In accordance with an embodiment of the method, the aforesaid objectives are achieved through a method for manufacturing a label 1 with a hanging handle 2, comprising the steps of:

i) providing a first laminated material 4 comprising a backing layer 6 and a first frontal layer 8 joined in a releasable manner;

ii) coating a frontal surface 10 of the first frontal layer 8 with at least one layer of release promoter 12, 18 (e.g. a silicone paint) leaving a free zone 14 from which the at least one layer of promoter 12, 18 is missing;

iii) optionally coating with registration a handle zone 16 of a first layer of release promoter 12 with a second layer of release promoter 18 in liquid or semi-liquid form;

iv) providing a second laminated material 20 comprising a second frontal layer 28 which is transparent to light and an adhesive layer 26';

v) joining the products of steps ii) and iv) or of steps iii) and iv) to form a coupled material 40, so that the adhesive layer 26' adheres at least to the free zone 14 of the first laminated material 4 (in particular, to form an anchoring foot 46);

vi) optionally solidifying or cross-linking the second layer of release promoter 18 in contact with the adhesive layer 26' of the second laminated material 20, to bond such layers 18, 26'; and vii) at least in the thickness S1 of the second laminated material 20, separating ("cutting out" according to a variant) a hanging handle 2 from the handle zone 16 at least one secondary label 34 of such label 1 in a different zone 36 (different with respect to the position of the handling handle 2), and forming a label outline 38 in the first frontal layer 8 so that the hanging handle 2, with the label formed, protrudes at least partially overhangingly beyond the label outline 38.

According to an alternative embodiment of the method, in step vii) the separation of the hanging handle 2 and of at least one secondary label 34 in a different zone 36 occurs in a direction opposite with respect to the forming of the label outline 38 in the first frontal layer 8 so that the hanging handle 2 is placed, with label 1 formed, partly overhanging beyond the label outline 38.

In accordance with a further embodiment, in step vii) separating and forming are die-cutting steps.

For example, the secondary labels 34 may be a plurality of secondary labels 34.

According to an embodiment, the different zone 36 may be superimposed only on the release promoter of the first layer 12 (when two layers of promoter are provided).

According to a variant, the hanging handle 2 is partly overhanging and extends beyond a label width 100. In other words, such handle protrudes outside the first frontal layer 8.

In an embodiment, the first laminated material 4 and/or the second laminated material 20 are initially in the form of a strip, which extends along a prevailing development direction X, X'.

According to a further embodiment, the first frontal layer 8 and/or the second frontal layer 28 may comprise or consist of a plastic film.

According to a yet further embodiment, the first frontal layer 8 and/or second frontal layer 28 may have an average density of about 50-500 g/m2, optionally 70-300 g/m2, e.g. about 150 g/m2.

In a variant, the frontal surface 10 of the first frontal layer 8 and/or a frontal surface 94 of the second frontal layer 28 are essentially planar and are optionally printable. In particular, one or both of these surfaces are configured so that graphic layers 56, 58 can be distributed and adhere to them.

At least part of the frontal surface 10 of the first frontal layer 8 will, therefore, remain visible on a bottle when label 1 is applied to it, specifically by virtue of the transparency of the second frontal layer 28.

According to an embodiment, the backing layer 6 serves as a releasable support for the completed label 1 and not only for the first frontal layer 8.

According to an embodiment, the second frontal layer 28 is only partially opacified at the hanging handle 2 to reveal its presence, according to an embodiment without concealing the first graphic layer 56 superimposed on the first frontal layer 8.

In other words, the partial opacification of the second frontal layer 28 allows, on the one hand, identifying the first graphic layer 56 (by virtue of the partial transparency of such layer 28), and, on the other hand, identifying the hanging handle which is partially superimposed on the first graphic layer 56 (by virtue of the opaque component, partially impervious to light, of such layer 28).

According to an embodiment, at the secondary label 34, the label 1 comprises an opaque contrast layer 104 (e.g. see FIG. 13 or FIG. 15), superimposed on the second frontal layer 28 to substantially eliminate its transparency, at least a second graphic layer 58 superimposed on the opaque contrast layer 104 and at least a protective layer 106 of the second graphic layer 58, at least partially transparent to light.

As a result, the opaque contrast layer 104 is a layer configured to opacify the transparency of the second frontal layer 28, and further to act as a background and create contrast with the second graphic layer 58.

The protective layer 106 is superimposed on the second graphic layer 58 (and preferably also on the opaque contrast layer 104) so that the abrasive phenomena which occur when the label is applied to a bottle do not remove or smudge the second graphic layer 58, or the opaque contrast layer 104 and second graphic layer 58 (according to the variant).

For example, for a dark or black second graphic layer 58, the opaque contrast layer 104 may be a soft and/or neutral color, e.g. white.

According to an embodiment, the protective layer 106 is applied at least over the second graphic layer 58 using a flexographic method.

According to an embodiment, the protective layer 106 is applied at least over the second graphic layer 58 by a method other than a flexographic method.

According to an embodiment, the protective layer 106 is applied with a thickness of at least 1 μm or more.

According to an embodiment, the protective layer 106 delimits a writable surface 108 through an ink writing instrument, e.g. a ballpoint pen (jotter), or with inline markings, e.g. heat transfer.

In other words, the protective layer 106 performs the dual function of protection (as discussed above) and of writable substrate to annotate customized information on the secondary label 34.

According to an embodiment, the second frontal layer 28 is opacified through a pigment or color mixed with a release promoter substance of a layer of release promoter 12, 18.

According to a particularly advantageous embodiment, the first laminated material 4 and a precursor 22 of the second laminated material 20 comprise corresponding or substantially identical layers. A definition of the term "identical" is given in the following description.

In an embodiment, such layers comprise, mutually superimposed, a backing layer 6, a de-adhesive layer 24 (e.g. silicone-based), an adhesive layer 26, 26' and a first frontal layer 8/second frontal layer 28. According to such variant, step iv) comprises a step of separating, and optionally discarding, the backing layer and the de-adhesive layer of the precursor 22 upstream of step v).

During the optional step vi), the second layer of release promoter 18 is then solidified (e.g.: cured) in contact with the adhesive layer 26', so as to bond such layers, and optionally so that the adhesive layer cannot perform its adhesive function as it is at least partially covered (and therefore rendered inert) by the second layer of solid release promoter 18.

In other words, according to such variant, the second layer of release promoter 18 works by "transfer" because, although it covers the first layer of release promoter 12, the second layer of release promoter 18 transfers to the adhesive layer 26' to make it inert in step vi).

In a further embodiment, the solidification step comprises a step of solidifying or cross-linking through electromagnetic radiation, e.g. UV radiation, or thermal radiation.

For example, step vi) may take place upstream of step vii).

According to a variant, the hanging handle 2 comprises at least one gripping portion 30 in which—in step iii)—the handle zone 16 also extends at such gripping portion 30.

In the embodiments shown, the hanging handle 2 and, if present, the gripping portion 30 comprises a portion protruding from an optionally curved outer edge 32 of the handle 2. For example, the protruding portion is not in adhesive contact with the first frontal layer 8, either by virtue of the double layer of the release promoter or because of its overhanging position with respect to it.

According to a further variant, step vii) comprises at least one sub-step of creating at least one creasing line 42, 44 on the second frontal layer 28, in order to deform the second frontal layer 28 and facilitate lifting of a portion, e.g. a peripheral portion, of the secondary label 34 and/or the hanging handle 2. According to an embodiment, the creasing line 44 is made at the gripping portion 30 to lift a peripheral portion.

In a variant, step vii) comprises at least a first step of die-cutting-creasing 82, and optionally a second step of die-cutting 84, described hereinbelow.

According to an embodiment, step vii) is carried out outside the free zone 14, so that in the zone 14 the second frontal layer 28 creates a single anchoring foot 46 of the hanging handle 2, from which a pair of arms 48, 48' mutually connected in a ring extend.

According to a further embodiment, during step ii) and/or step iii), the first frontal layer 8 and/or the first (or only) layer of release promoter 12 are partially covered with one or more protective masks (not shown) which prevent the coating of some zones 52, 50 with the first layer of release promoter 12 and/or the second layer of release promoter 18, to modulate the separation force of an edge 32 (e.g. the outer edge) of the hanging handle 2 and/or a lifting portion 54 of the secondary label 34.

By way of example, at least one protective mask may comprise approximately punctiform protective elements, spaced along the extension of the edge 32 and/or the lifting portion 54 with predefined density.

As regards such density, it will be commensurate with the size of handle 2 and secondary label 34 and to the nature of the adhesive layer 26'.

According to a variant, the second frontal layer 28 is at least partially transparent to light to reveal an optional first graphic layer 56 distributed on the first frontal layer 8 (in particular upstream of step ii), e.g. as shown in FIG. 1). In a further variant, a layer of release promoter (e.g. the second layer of release promoter 18) comprises at least one pigment or color to make apparent (i.e. to reveal the presence of) at least part of the hanging handle 2.

Specifically, the pigment or color may be mixed with the release promoting substance of the layer of release promoter 18 (e.g. the second layer).

According to an embodiment, step vii) is followed by at least one step of scrap removing 60 in which, outside the hanging handle 2 and/or secondary label 34, the second frontal layer 28 and the first frontal layer 8 in its sole part, die-cut and placed under the portion of the hanging handle 2 that will be overhanging, is taken as continuous scrap 62, to create a lifting step 64 about the hanging handle 2 and/or secondary label 34 and to make a part of the overhanging hanging handle 2.

The aforesaid objectives are also achieved through a label 1 with a hanging handle 2 as described below.

Since a variant of the label provides manufacturing by the previous method, even where not expressly stated, the label may comprise any characteristic that can be inferred—from the point of view of the process—from the description above.

According to an embodiment, the label 1 comprises:

- a first laminated material 4 comprising a backing layer 6 and a first frontal layer 8 joined in a releasable manner;
- at least one layer of release promoter 12, 18, which coats a frontal surface 10 of the first frontal layer 8 leaving free a zone 14 from which the layer 12, 18 of release promoter is missing;
- an optional second layer of release promoter 18, which covers with registration a handle zone 16 of a first layer of release promoter 12;
- a second laminated material 20 comprising a second frontal layer 28, optionally transparent to light, and an adhesive layer 26', the second laminated material 20 being joined to the first laminated material 4 so that the adhesive layer 26' adheres at least to the free zone 14;
- wherein at least the thickness S1 of the second laminated material 20 delimits a hanging handle 2 at the handle zone 16, a secondary label 34 in a different zone 36, and wherein the first frontal layer 8 forms a label outline 38.

Optionally, the second layer of release promoter 18 is solidified in contact with the adhesive layer 26', to bond the layers 18, 26'.

According to a variant, the hanging handle 2 comprises at least one gripping portion 30, wherein the handle zone 16 also extends at such gripping portion 30.

According to a further variant, the second frontal layer 28 delimits at least one creasing line 42, 44 to facilitate lifting of a portion, e.g. a peripheral portion, of the secondary label 34 and/or the hanging handle 2.

According to a yet further variant, in the free zone 14, the second frontal layer 28 comprises a single anchoring foot 46 of the hanging handle 2, from which a pair of arms 48, 48' mutually connected in a ring extends.

Optionally, the pair of arms 48, 48' may be rotated with respect to the anchoring foot 46 (around a rotation axis R, in accordance with an embodiment, common to both arms), to allow the handle to be carried folded out of the label, and to act as hanging element of a bottle associated with it, in an upside-down position.

According to an embodiment, the second frontal layer 28 is at least partially transparent to light to reveal an optional first graphic layer 56 distributed on the first frontal layer 8.

According to an embodiment, the second frontal layer 28 is only partially opacified at the hanging handle 2 to reveal its presence without concealing the first graphic layer 56 superimposed on the first frontal layer 8.

According to an embodiment, at the secondary label 34, the label 1 comprises an opaque contrast layer 104, superimposed on the second frontal layer 28 to substantially eliminate its transparency, at least a second graphic layer 58 superimposed on the opaque contrast layer 104 and at least a protective layer 106 of the second graphic layer 58, at least partially transparent to light.

Optionally, a layer of release agent (e.g. second layer 18) may comprise at least one pigment or color to make apparent at least one part of the hanging handle 2, according to a variant without concealing the first graphic layer 56.

According to an embodiment, outside the hanging handle 2 and/or secondary label 34, the second frontal layer 28 is missing, to create a lifting step 64 about the handle and/or such secondary label 34.

According to an embodiment, the protective layer 106 is applied at least over the second graphic layer 58 using a flexographic method.

According to an embodiment, the protective layer 106 is applied with a thickness of at least 1 μm or more.

According to an embodiment, the frontal surface 10 of the first frontal layer 8 is coated with a first 12 and a second 18 mutually superimposed layers of release promoter outside the secondary label 34.

The manufacturing method diagrammatically shown in FIG. 1, in which the manufacturing direction F1, F2 extends from left to right according to the orientation of the arrows, will now be illustrated by way of example only.

At first, a first laminated material 4 and a precursor 22 of a second laminated material 20 are fed from two separate feeding reels, indicated by reference numerals 66, 68.

According to an embodiment, the first laminated material 4 and the precursor 22 are identical materials, or corresponding materials, fed from the two different reels 66, 68.

In the present description, the term "identical" indicates a material with the same laminations, although different layers may, in principle, be chemically different between the first laminated material and the precursor (and therefore also between the first and second laminated material).

The "common" laminated material is optionally formed by the following layers, superimposed from bottom to top in the order specified below: a backing layer 6, a de-adhesive layer 24 (e.g. silicone), an adhesive layer 26, 26' and a first frontal layer 8/second frontal layer 28, e.g. printable.

The aforesaid layers are mutually superimposed completely, with a substantially full surface, or in a prevalent manner.

The backing layer 6 and the de-adhesive layer 24 are immediately removed from the precursor 22 coming from the reel 68. They are separated and wound back onto a reject reel 70, while the adhesive layer 26' and the second frontal layer 28 form the second laminated material 20 which will continue towards a joining point 72 in the direction F1.

According to an embodiment, at the arrow 102 (i.e. after separation), on the second laminated material 20, the opaque contrast layer 104 superimposed on the second frontal layer 28, the second graphic layer 58 superimposed on the opaque contrast layer 104 and the protective layer 106 of the second graphic layer 58 are distributed/printed in the area in which the secondary label 34 will be created.

According to a variant, a first graphic layer 56 (e.g. containing product information) is distributed/printed on the first laminated material 4 coming from the reel 66 and, a single layer of release promoter, or a first 12 and a second 18 layers of release promoter, e.g. silicone paint, are superimposed over the first graphic layer 56 to obtain the intermediate material 74.

The first or single layer of release promoter 12, in contact with the first graphic layer 56, occupies a smaller surface area than the frontal surface 10 of the first frontal layer 8. More precisely, the first or single layer of release promoter 12 is applied to leave a free zone 14 from which the first layer of release promoter 12 is missing.

For example, the layer of release promoter 12 may be applied in a retracted position with respect to a first longitudinal edge 76 of the first laminated material 4, so as to offer a free surface to the second laminated material 20—which will be superimposed on the intermediate material 74 at the joining point 72—onto which an anchoring foot 46 of the hanging handle 2 made from the second laminated material 20 can firmly adhere.

Instead, the optional second layer of release promoter 18, superimposed and optionally in contact with the first layer of release promoter 12, will be applied with registration with the preset position of the hanging handle, in liquid or semi-liquid form.

In the present description, the term "registration" means an application on a layer with a specific shape, in this case substantially corresponding to the surface of the hanging handle.

Appropriately shaped masks may be used for this purpose, covering the underlying first layer of release promoter 12 to prevent depositing the second layer of release promoter 18 outside the profile of the handle 2.

Regarding the expression "semi-liquid" used above, it is worth noting that, in this description, the term "semi-liquid" means any liquid substance capable of flowing, even with low fluidity, in particular at the working temperature of step iii).

By way of non-exhaustive example, such term may mean any viscous, gelatinous and/or pasty substance.

According to a variant, the hanging handle 2 is made apparent through a partial opacification/pigmentation/coloring of the second frontal layer 28, which creates a visual or chromatic separation from the first frontal layer.

Optionally, the partial opacification/pigmentation/coloration of the second frontal layer 28 may be achieved through the characteristics of the layer of release promoter 18, which specifically comprises a pigment/color.

For example, such pigment or color may be mixed with the release promoter substance of the second layer of release promoter 18 or placed on the surface of the second layer of release promoter 18 facing the second frontal layer 28.

The function of the optional second layer of release promoter 18 is, of course, to neutralize adhesion power of the adhesive layer 26' of the second layer material 20, or make it almost completely inert, through the transfer mechanism described above, to facilitate lifting of the handle (alone).

The intermediate material 74 and the second laminated material 20 are then joined at the joining point 72, being joined and pressed by a pair of rollers 78, 80, thus creating the laminated material 40.

After the manufacturing of the laminated material 40, the optional second layer of release promoter 18 is then solidified in contact with the adhesive layer 26', e.g. by UV radiation, to bond such layers 18, 26' and to make the adhesive layer "passive" 26'.

At a later step, the method continues with a first step of die-cutting-creasing 82, and a second step of die-cutting 84, each followed by a step of eliminating production scraps 62, 86.

During the first step of die-cutting-creasing 82, a tool configured to fold/crease, without scoring, the second frontal layer 28 at the hanging handle 2 (in particular at the gripping portion 30 thereof, when provided) and/or the lifting portion 54 of a secondary label 34 may optionally be used.

As far as the position of the secondary label 34 is concerned, the latter will, in accordance with an embodiment, be positioned above the first layer of release promoter 12 only, because the adhesive power of the secondary label 34 must not be eliminated (or rather must not be made inert) entirely, as in the case of the hanging handle.

In such manner, through the transfer and solidification of the optional second release promoter in (semi-)liquid form, it will be possible to make the adhesive layer 26' at the hanging handle 2 inert, without conditioning the adhesive power of the secondary label 34.

In all other portions, other than the creasing lines 42, 44, the die-cutting depth 82, i.e. the cutting depth of the laminated material 40, will extend until at least the second frontal layer 28, and optionally also the second layer of release promoter 18, are scored, possibly without notching the layer 12 underneath it.

Figure 12A:
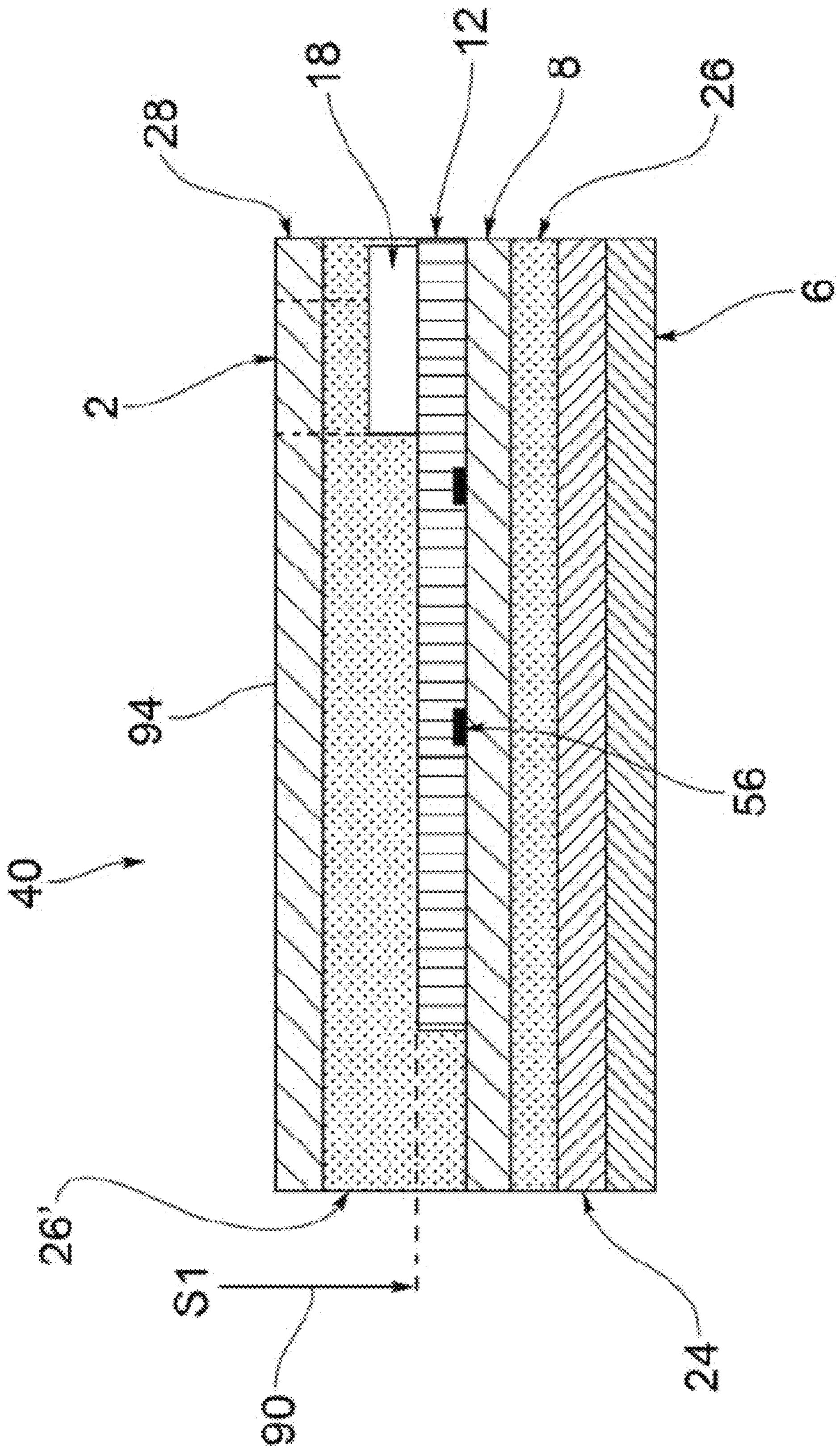
FIGS. 12A, 12B, 12C, 13 and 13B show sections taken along the planes XII-XII, XIII-XIII in FIG. 11, respectively, in which the arrows diagrammatically show the depth of separation, cutting or die-cutting through the illustrated materials and in which the views show the sections before and after the removal of die-cutting scraps.
Figure 12B:
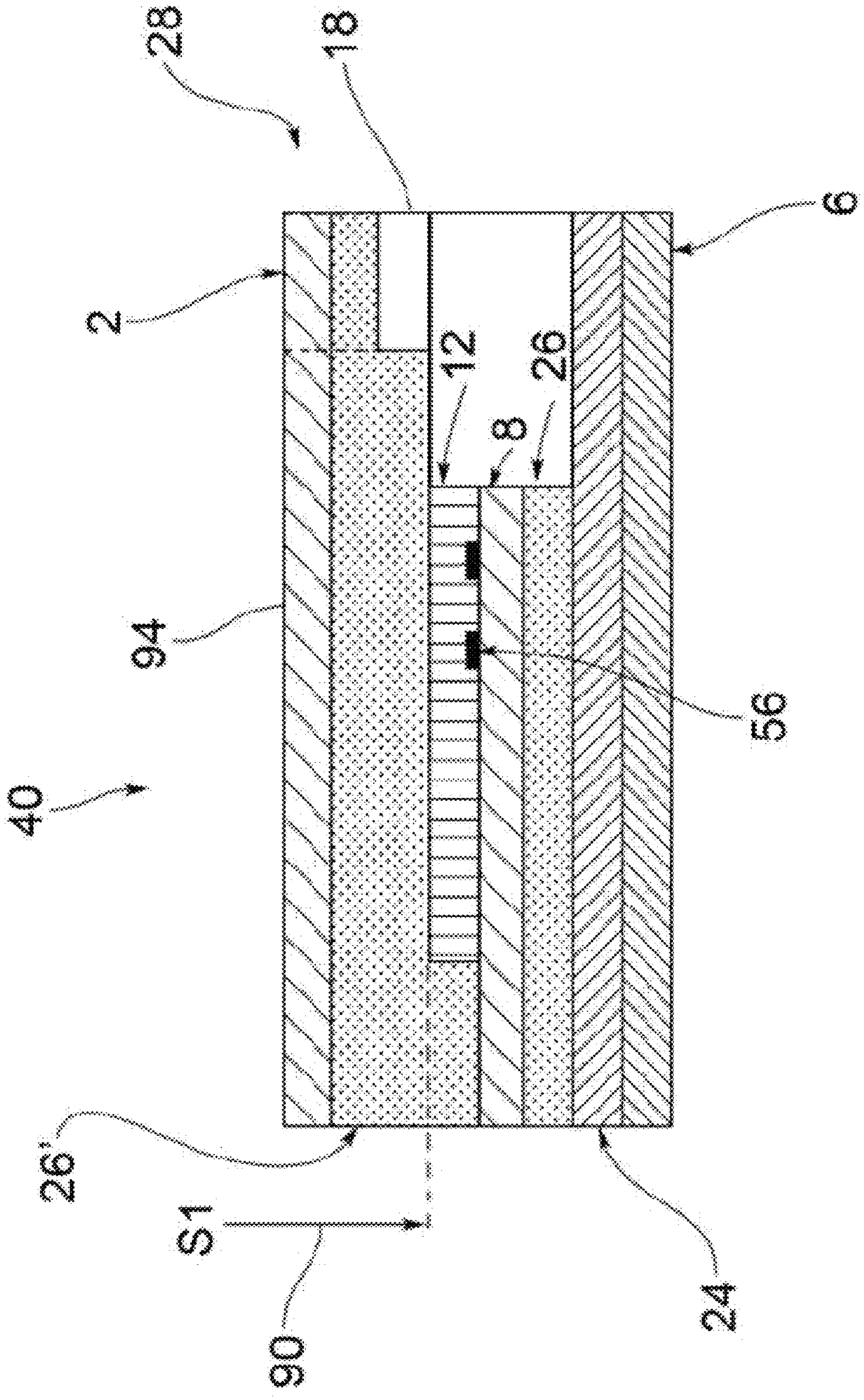
Figure 12C:
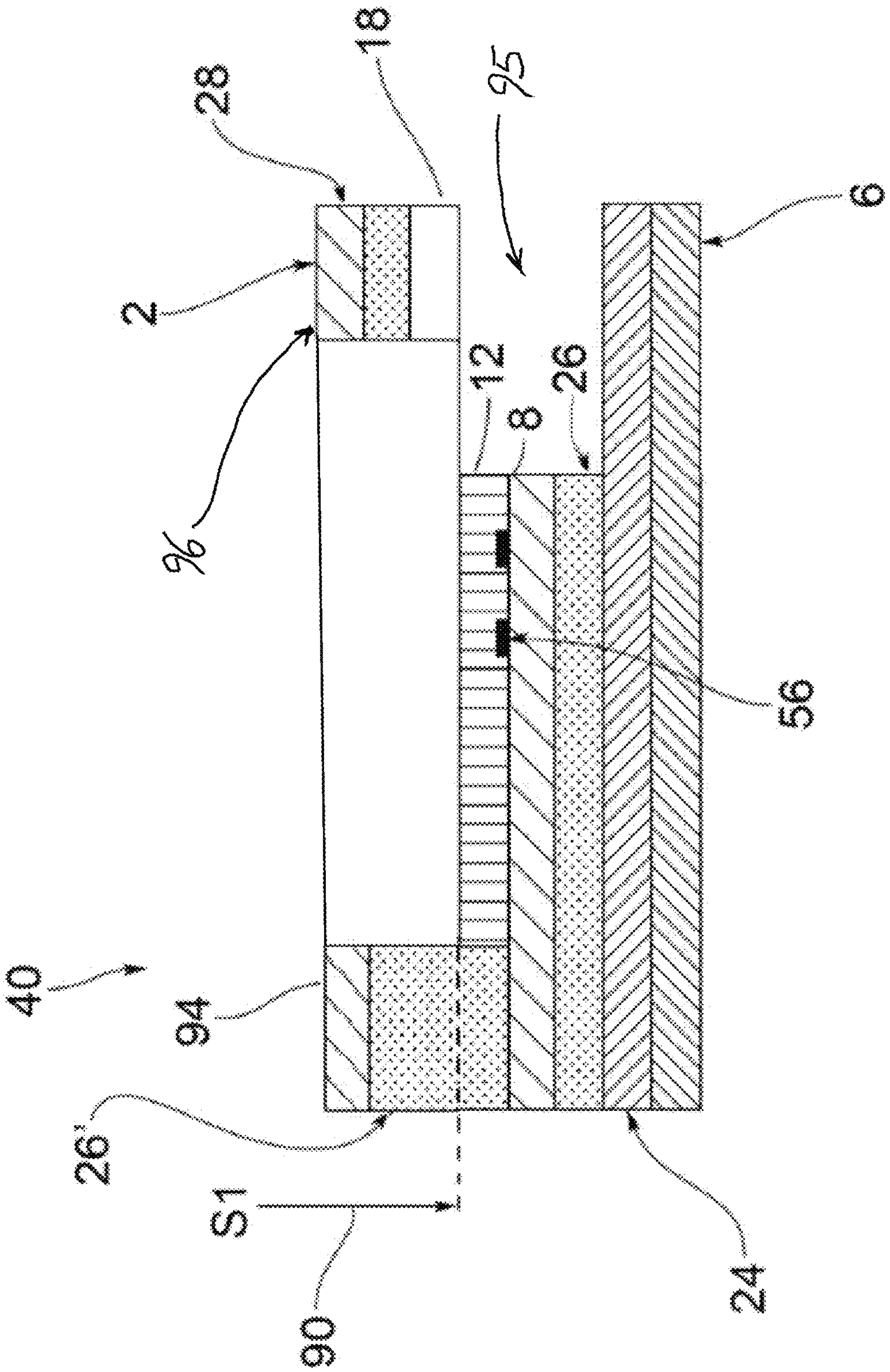
Figure 13:
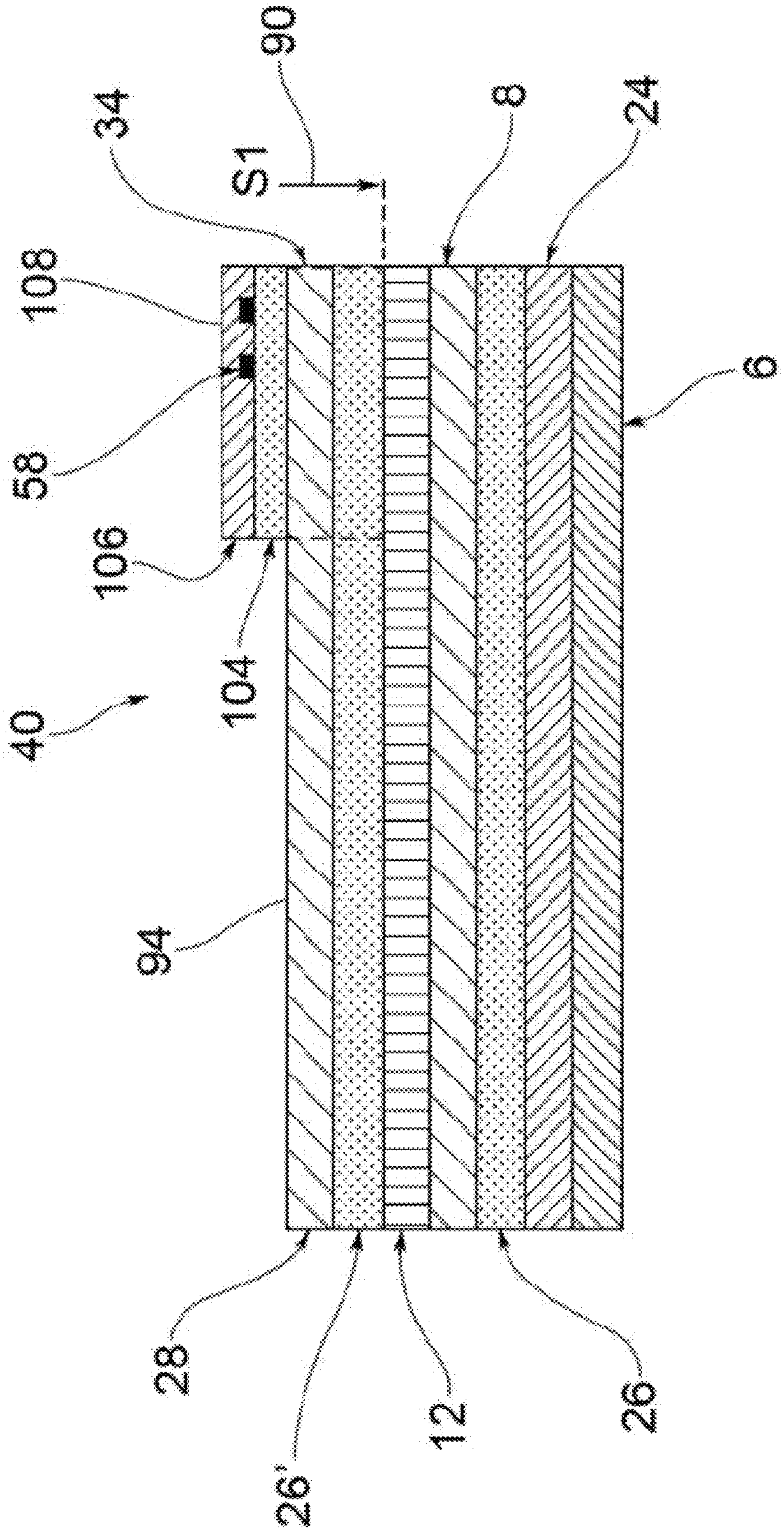
Figure 13B:
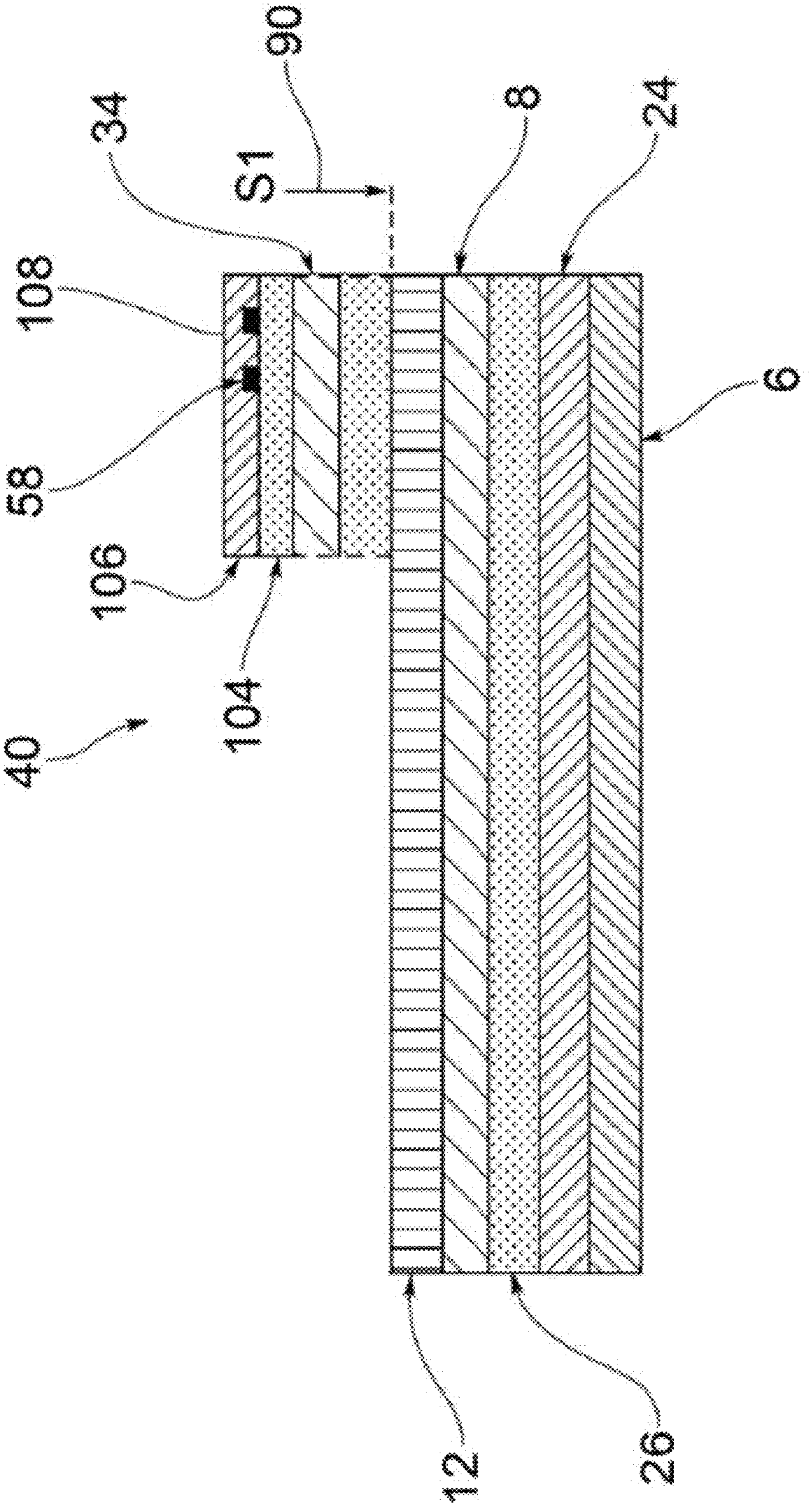

The scoring depth of the coupled material 40 in this first step 82 is indicated by the arrows 90 in FIGS. 12, 13.

Figure 14:
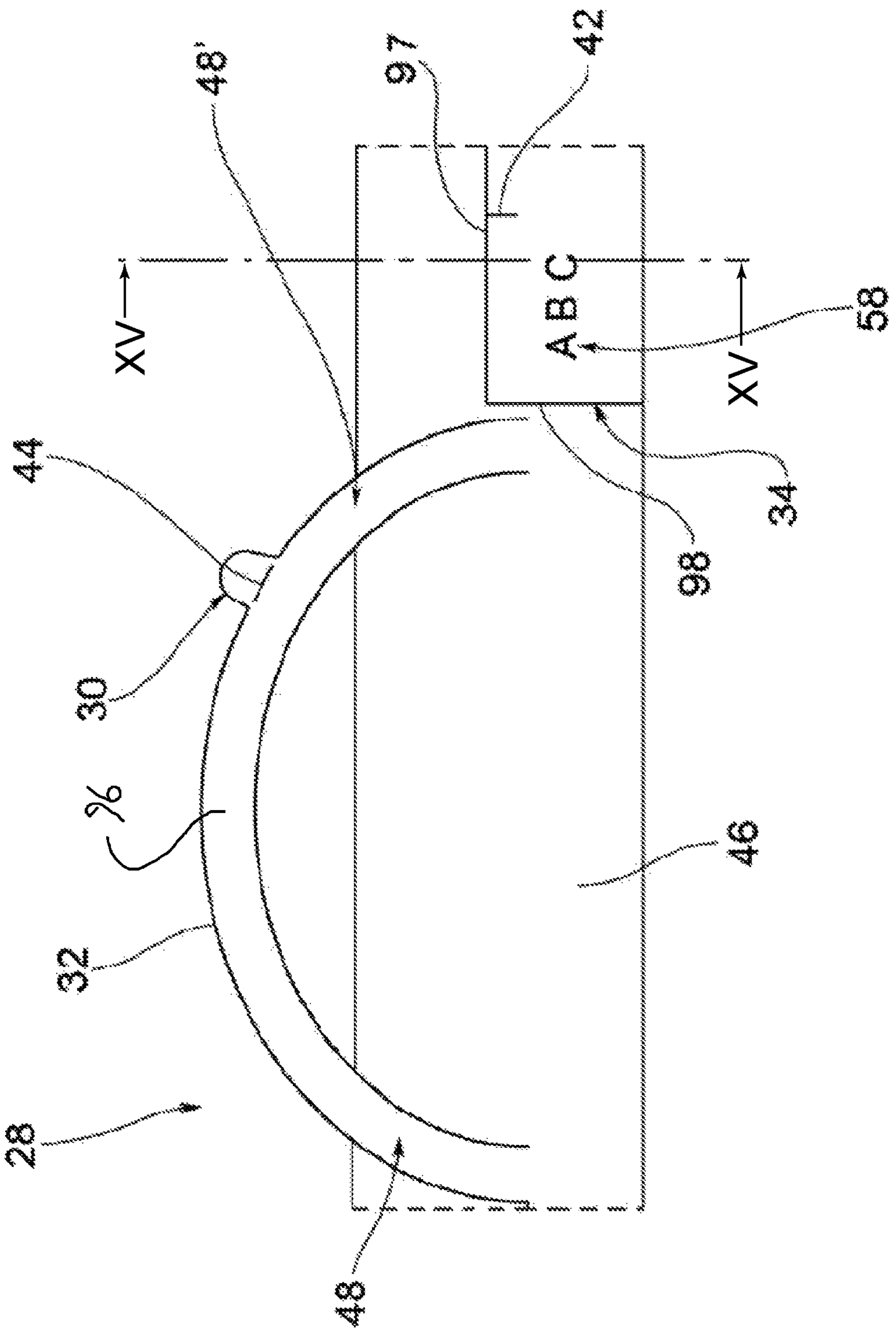

The profile of the first step of die-cutting-creasing 82 is such as to create, both internally and externally, the shape of the handle, and is such as to cut out the second frontal layer 28 in part (e.g.: along a pair of optionally orthogonal sides 97, 98; FIG. 14) about the perimeter of the secondary label 34.

Figure 17:
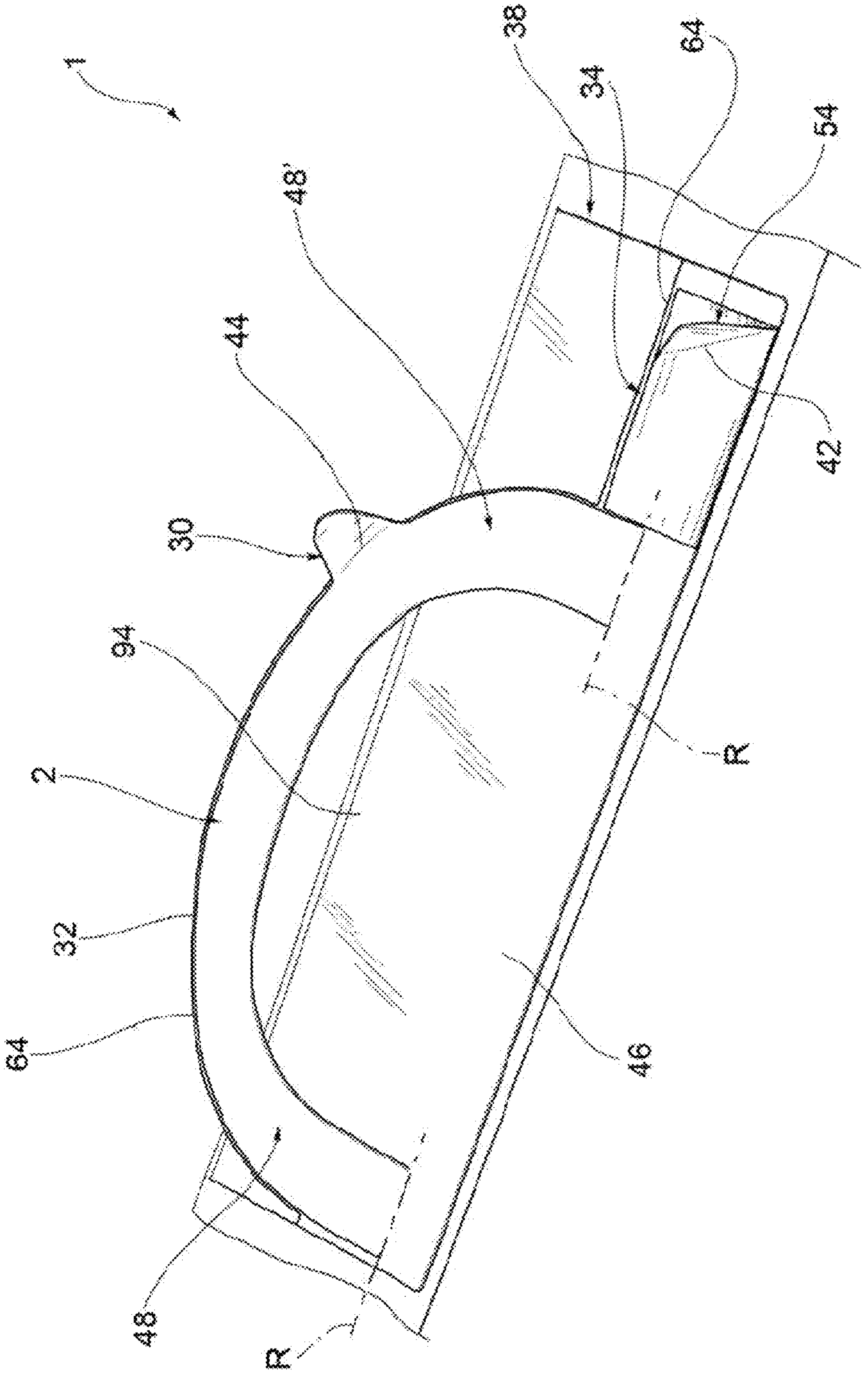

The portion removed as continuous scrap 62 downstream of the first step of die-cutting-creasing 82 is, therefore, a ribbon of complementary shape to the lifting step 64 shown in FIG. 17, as well as the portion of the first frontal layer which was placed under the portion of the hanging handle 2 which is left overhanging.

Figure 15:
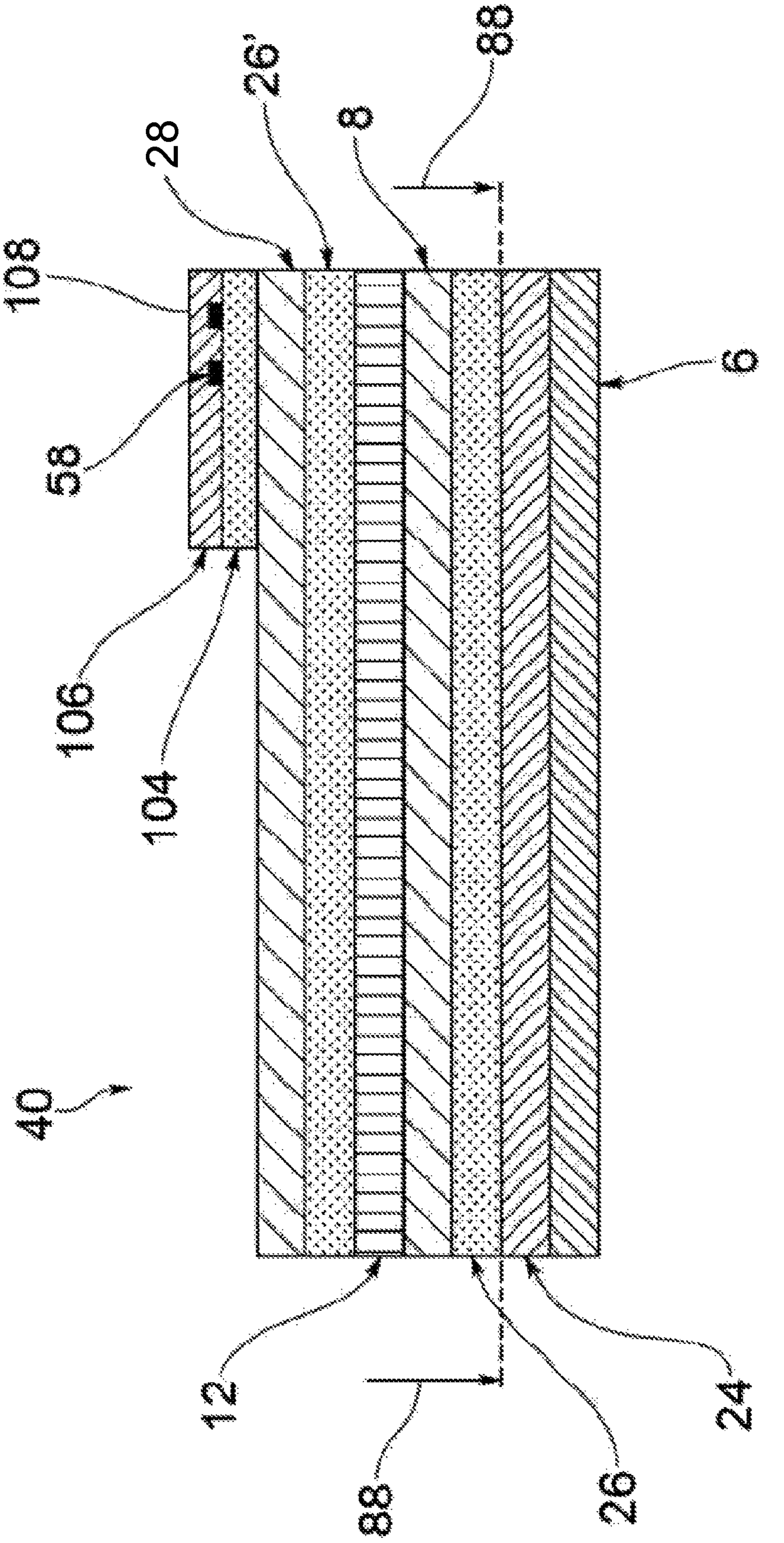
FIG. 15 shows a section view taken along the plane XV-XV indicated in FIG. 14.
Figure 16:
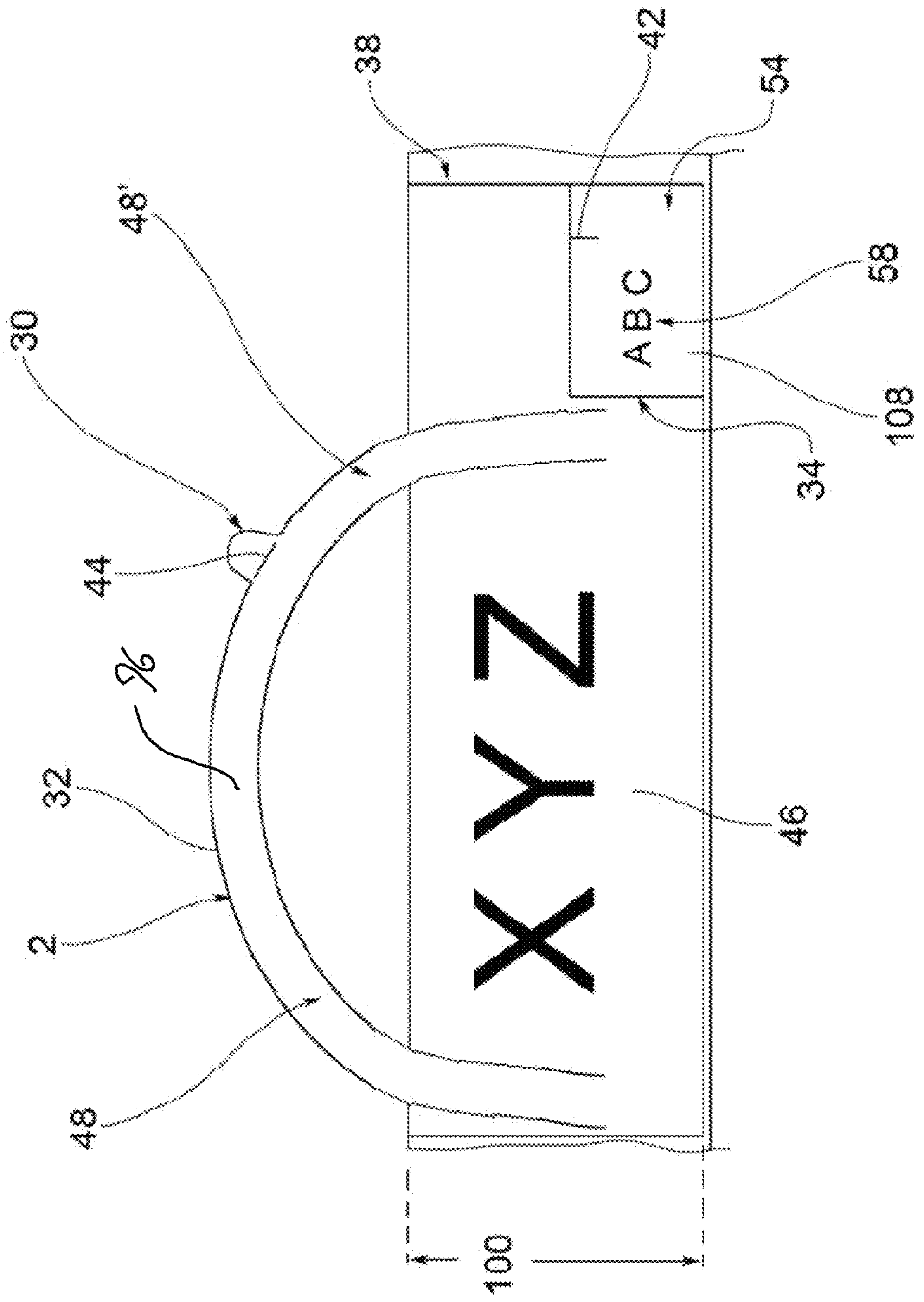

During the second step of die-cutting 84, a cutting tool is used, configured to score the laminated material 40 from its surface 94 at least up to the first frontal layer 8, and optionally up to the adhesive layer 26 of the original laminated material 74, as diagrammatically shown by the arrows 88 schematically shown in FIG. 15.

In any case, within the exposed surface of the label 1, this second step of die-cutting 84 will cut the label outline 38 about the first frontal layer 8 and the hanging handle 2.

FIG. 13 shows the position of the secondary label 34 in relation to the first (or only) layer of release promoter 12.

For the secondary label 34, the single or first layer of release promoter 12 may be specially modulated, by depositing the promoter only in some zones, thus preventing the formation of an inert layer under the adhesive layer of the secondary label.

Figure 5:
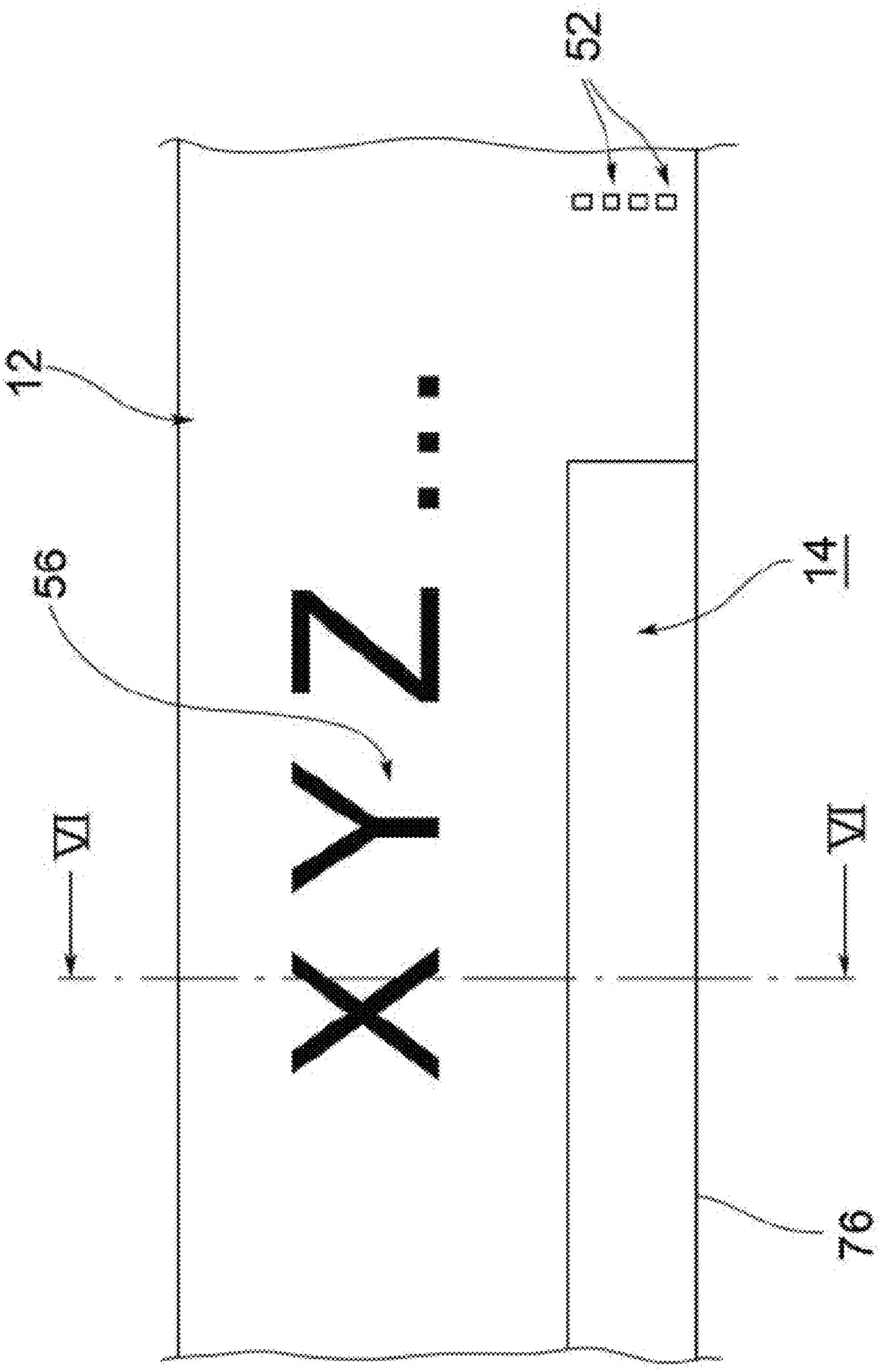
Figure 6:
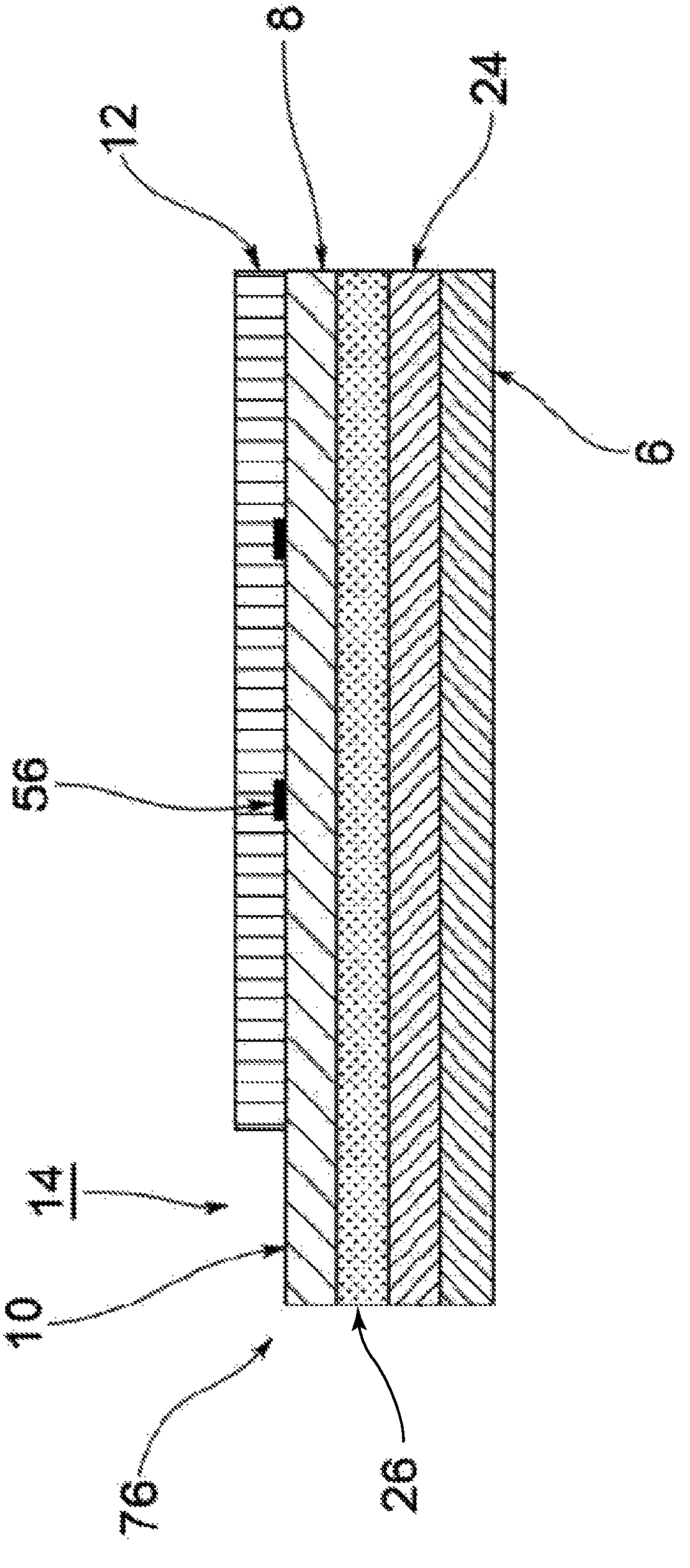
FIG. 6 shows a section view taken along the plane VI-VI indicated in FIG. 5.
Figure 7:
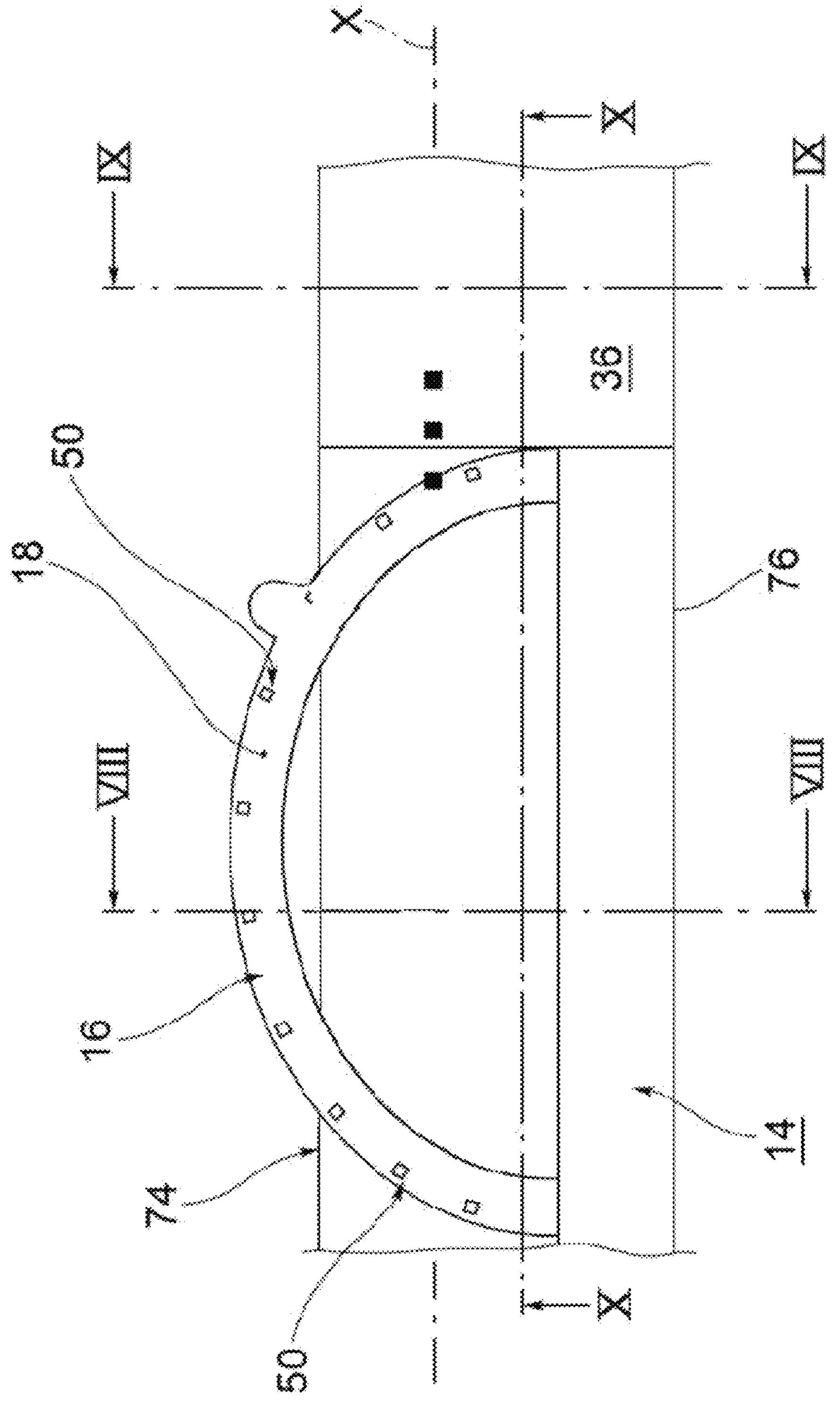
Figure 8:
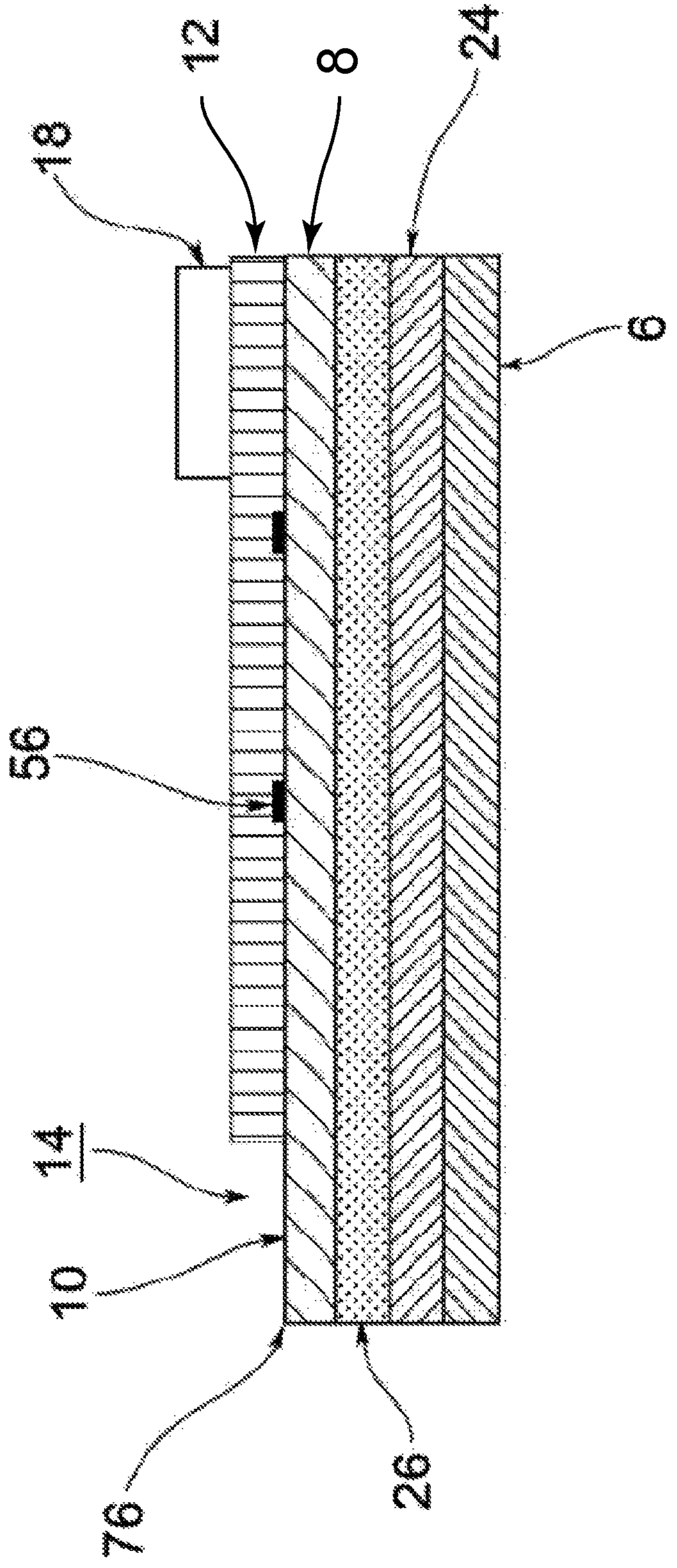
FIGS. 8, 9, 10 show sections taken along the planes VIII-VIII, IX-IX, X-X in FIG. 7, respectively.
Figure 9:
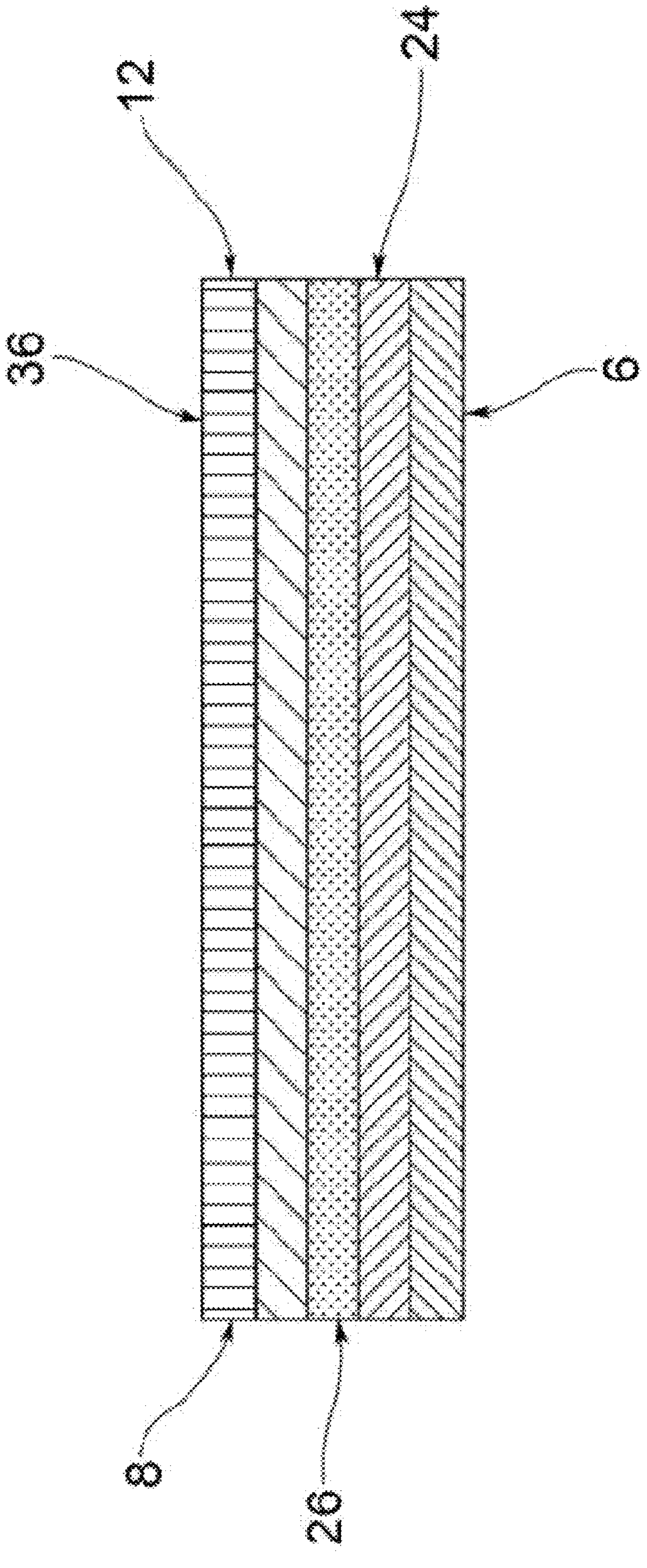
Figure 10:
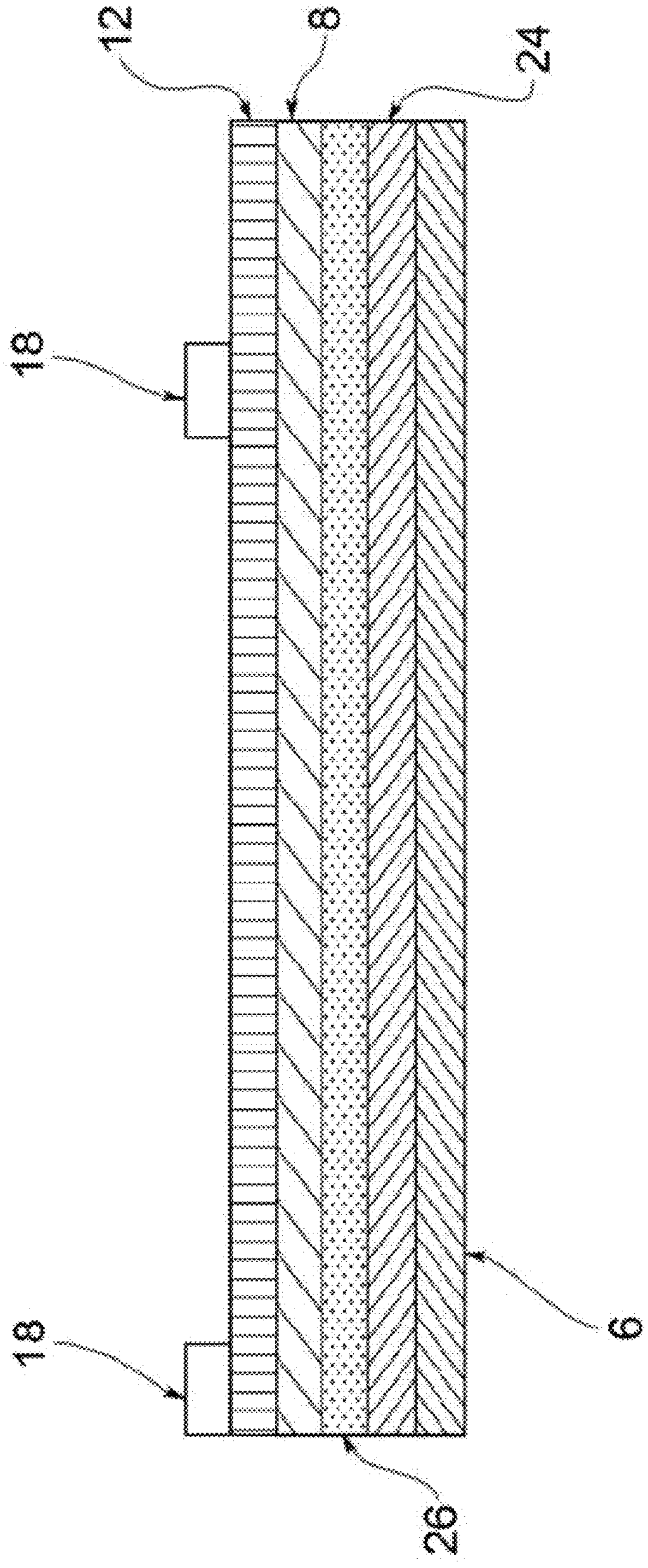
Figure 11:
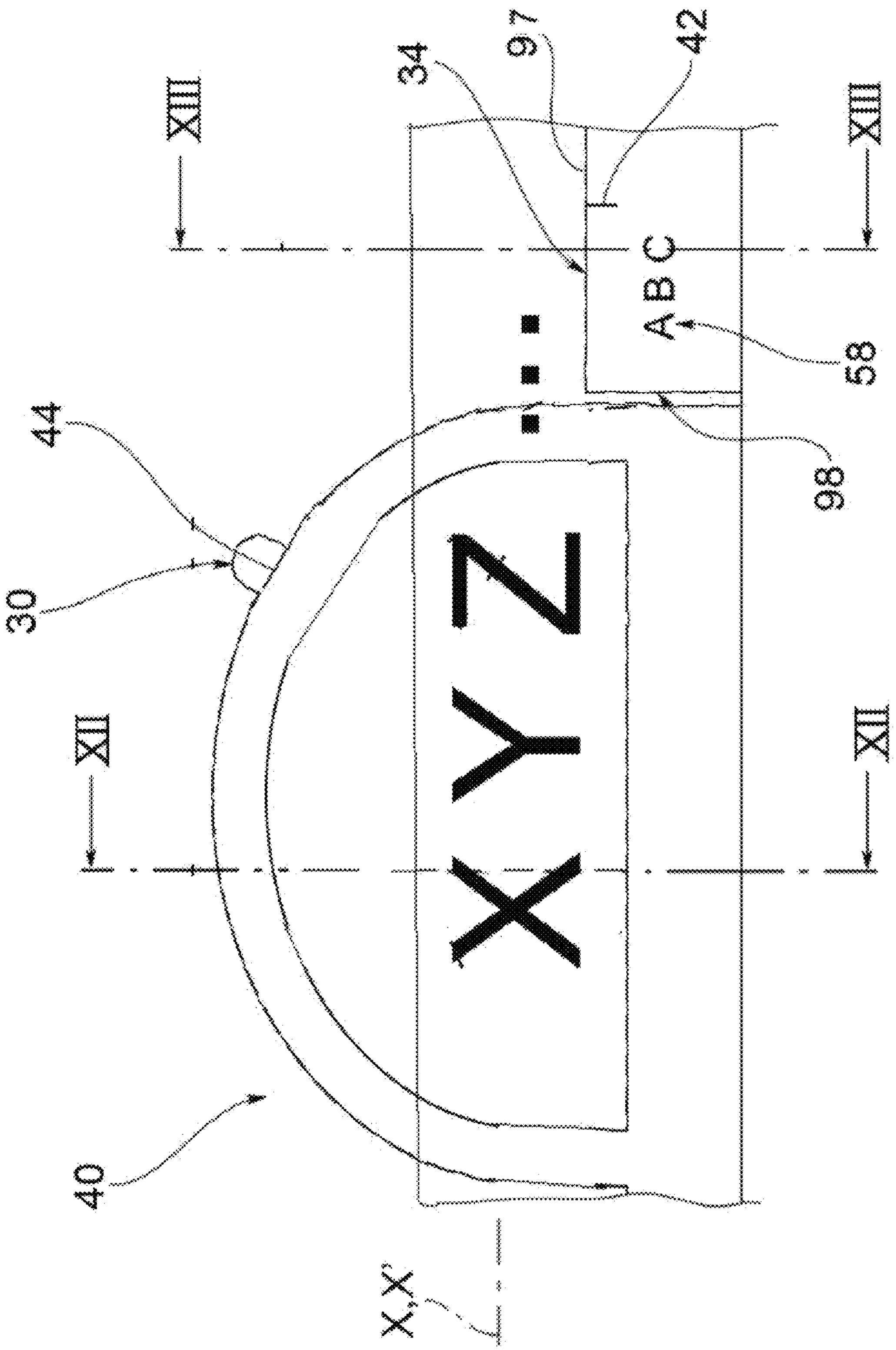

In this regard, protective masks may be used to prevent covering certain zones 52 (FIG. 5) of the first frontal layer 8. A similar expedient may be used to prevent coating some zones 50 below the second frontal layer with the second layer of release promoter 18, to obtain a handle which is dry and not sticky to the touch.

On the contrary, in FIG. 12, the optional double layer 12, 18 of release promoter under the hanging handle 2 in the portions outside the anchoring foot 46 can be observed.

The second step of die-cutting 84, therefore, has the function of creating the separation between adjacent labels 1, and the continuous scrap 86 will be shaped as a ribbon in which empty seats are obtained (rectangular seats according to the shapes shown), of a shape complementary to the label outline 38 of each label, interspersed with separating partitions corresponding to the material removed to divide the labels 1.

After eliminating the second continuous scrap 86, the labels 1 have been created and can be wound on a collection reel 92 (FIG. 1).

Innovatively, the method and label of the present invention allow brilliantly overcoming the drawbacks of the prior art.

More precisely, the method and handle of the present invention allow obtaining in a simple manner a handle which extends well beyond the label outline 38.

Furthermore, the method and handle of the present invention allow modulating transparencies and opacity of the second frontal layer, so as not to conceal the first graphic layer, to show the position of the hanging handle, to suppress the transparency of such layer to the secondary label to achieve a contrast for the second graphic layer and to protect the second graphic layer.

According to an embodiment, the method and label of the present invention allow obtaining a label with handle in a single production step, without having to perform special operations (e.g. such as gluing the handles one-by-one), in a simple, reliable and cost-effective manner.

According to an embodiment, the method and label of the present invention allow obtaining a secondary label which can be written, thus allowing it to be handwritten according to needs.

According to an embodiment, the method and the label of the present invention provide an innovative system of coating in liquid or semi-liquid form, and subsequent solidification or targeted cross-linking, to create a passive layer by transfer under the handle.

Furthermore, the handle is easy to handle because it is dry to the contact.

According to an embodiment, the method and label of the present invention allow achieving an important economy of production, not only by virtue of raw materials involved in manufacturing.

According to an embodiment, the method and the of of the present invention allow obtaining an excellent grip on the handle and/or secondary label.

According to an embodiment, the method and label of the present invention provide an extremely cost-effective way to locate the handle without covering the underlying graphics.

According to an embodiment, the method and the label of the present invention allow creating specific ergonomic portions to ensure easy interaction with the user.

According to an embodiment, the risk of tearing the handle or one of its arms from the foot is virtually absent under normal conditions of use.

According to an embodiment, the method and the label of the present invention provide an additional system to regulate the adhesive power of the portions which can be lifted from the plane of the label.

According to an embodiment, the method and the label of the present invention allow obtaining labels which can be applied as a continuous strip, so that their application on bottles in automated processes is simplified.

According to an embodiment, the method of the present invention is cost-effective, and the label described can be produced at a low cost.

In order to meet specific needs, those skilled in the art may make variants or substitutions of elements with functionally equivalent ones to the embodiments of the method and label above.

Such variants are also contained within the scope of protection as described and claimed herein.

Furthermore, each variant described as belonging to a possible embodiment may be implemented independently from the other described variants.

REFERENCES

1 label
2 hanging handle
4 laminated material
6 backing layer
8 first frontal layer
10 frontal surface of first layer
12 first layer of release promoter—e.g. silicone paint
14 zone free from release promoter layer
16 handle zone
18 second layer of release promoter—e.g. silicone paint
20 second laminated material
22 precursor of the second laminated material
24 de-adhesive layer
26 adhesive layer
26' adhesive layer
28 second frontal layer transparent to light
30 handle gripping portion
32 handle outer edge
34 secondary label
36 different zone with respect to the position of the hanging handle
38 label outline
40 assembled component or laminated material
42 creasing line
44 creasing line
46 anchoring foot
48 pair of handle arms
48' pair of handle arms
50 free zones of the first and/or second layer of release promoter
52 free zones of the first and/or second layer of release promoter

54 lifting portion of the secondary label
56 first graphic layer
58 second graphic layer
60 scrap
62 continuous scrap
64 lifting step
82 die-cutting-creasing
84 second die-cutting step
94 frontal surface of the second frontal layer
95 cavity under a portion of overhanging hanging handle
96 overhanging handle portion
100 label width
104 opaque contrast layer
106 protective layer of the second graphic layer
108 surface which can be written on with an ink writing instrument
S1 thickness of the second frontal layer
X prevalent direction of extension
X' prevalent direction of extension
R rotation axis
F1 direction of manufacture
F2 direction of manufacture

The invention claimed is:

1. A method for manufacturing a label with a hanging handle, the method comprising:

i) providing a first laminated material comprising a backing layer and a first frontal layer joined in a releasable manner, wherein said first frontal layer comprises a frontal surface;

ii) coating said frontal surface of the first frontal layer with at least one layer of release promoter, leaving a free zone in which said at least one layer of release promoter is missing;

iv) providing a second laminated material comprising a second frontal layer and an adhesive layer, wherein said second laminated material has a predefined thickness;

v) joining said first laminated material and said second laminated material to form an assembled component or coupled material so that the adhesive layer of the second laminated material adheres at least to the free zone of the first laminated material; and vii) cutting a hanging handle in a handle zone of said second laminated material only to the inside of the thickness of the second laminated material, leaving said first frontal layer intact; cutting at least one secondary label in a secondary label zone different from said handle zone only within the thickness of the second laminated material; forming a label outline in the first frontal layer, avoiding cutting the hanging handle and removing a portion of said first frontal layer thus creating a cavity that arranges a handle portion of said hanging handle, with the label formed, protruding overhangingly beyond said label outline, overhanging said cavity.

2. The method of claim 1, wherein said second frontal layer is transparent to light.

3. The method of claim 1, wherein:

said second frontal layer is opacified only partially at the hanging handle to reveal the hanging handle without concealing a first graphic layer superimposed on the first frontal layer and wherein, at the at least one secondary label, said label comprises an opaque contrast layer, superimposed on the second frontal layer to eliminate its transparency, a second graphic layer superimposed on the opaque contrast layer and a protective layer of the second graphic layer, at least partially transparent to light; and wherein said protective layer is applied over the second graphic layer by a flexographic method, with a thickness of at least 1 μm or more.

4. The method of claim 3, wherein said protective layer delimits a writable surface through an ink writing instrument or inline markings.

5. The method of claim 1, wherein the second frontal layer is opacified through a pigment or color mixed with a release promoter substance of the at least one layer of release promoter.

6. The method of claim 1, wherein in step vii) cutting the hanging handle in the handle zone and the at least one secondary label in the secondary label zone occurs in a direction opposite to forming the label outline in the first frontal layer so that the hanging handle is placed, with the label formed, partly cantilevered beyond said label outline.

7. The method of claim 1, wherein the first laminated material and a precursor of the second laminated material comprise corresponding or identical layers which comprise, mutually superimposed, a backing layer, a de-adhesive layer, an adhesive layer and a first/second frontal layer, and wherein step iv) comprises a step of separating and discarding the backing layer and the de-adhesive layer of said precursor upstream of step v).

8. The method of claim 1, wherein step vii) is carried out outside the free zone, so that in said free zone the second frontal layer creates a single anchoring foot of the hanging handle, from which a pair of arms mutually connected in a ring extend.

9. The method of claim 1, wherein step ii) comprises a step of coating with a first and a second mutually superimposed layers of release promoter outside the at least one secondary label.

10. A label with a hanging handle made using the method of claim 1, said label comprising:

a first laminated material comprising a backing layer and a first frontal layer joined in a releasable manner, wherein said first frontal layer comprises a frontal surface;

at least one layer of release promoter coating the frontal surface of the first frontal layer leaving free a zone in which said at least one layer of release promoter is missing; and a second laminated material comprising a second frontal layer and an adhesive layer, said second laminated material being joined to the first laminated material so that the adhesive layer adheres at least to the free zone, wherein the second frontal layer has a predefined thickness;

wherein said second frontal layer delimits the hanging handle and a secondary label in a secondary label zone, and wherein the first frontal layer forms a label outline leaving said hanging handle with a handle portion protruding at least partially overhanging beyond said label outline outside the first frontal layer directly facing said backing layer, thus forming a cavity in which a portion of said first frontal layer has been removed, said handle portion overhanging said cavity.

11. The label of claim 10, wherein said second frontal layer is transparent to light.

12. The label of claim 10, wherein:

said second frontal layer is opacified only partially at the hanging handle to reveal the hanging handle without concealing a first graphic layer superimposed on the first frontal layer and wherein, at the secondary label, said label comprises an opaque contrast layer, superimposed on the second frontal layer to eliminate its transparency, a second graphic layer superimposed on the opaque contrast layer and a protective layer of the second graphic layer, at least partially transparent to light; and wherein said protective layer is applied over the second graphic layer by a flexographic method, with a thickness of at least 1 μm or more.

13. The label of claim 12, wherein said protective layer delimits a writable surface through an ink writing instrument or inline markings.

14. The label of claim 10, wherein said second frontal layer is opacified through a pigment or color mixed with a release promoter substance of the at least one layer of release promoter.

15. The label of claim 10, wherein in the free zone, the second frontal layer creates a single anchoring foot of the hanging handle, from which a pair of arms mutually connected in a ring extend.

16. The label of claim 10, wherein the frontal surface of the first frontal layer is coated with a first and a second mutually superimposed layers of release promoter outside the secondary label.

* * * * *